(12) United States Patent
Shwartz et al.

(10) Patent No.: US 12,498,572 B2
(45) Date of Patent: Dec. 16, 2025

(54) SYSTEM AND METHOD FOR OPTICALLY COMBINING VIRTUAL IMAGES INTO REAL WORLD SCENERY

(71) Applicant: Fourier Optics Ltd, Ramat Gan (IL)

(72) Inventors: Shoam Shwartz, Hod Hasharon (IL); Omri Barlev, Tel Aviv-Jaffa (IL); Asaf Akiva Carmel, Zichron Yaakov (IL); Igor Tikhonenkov, Kiriat Motskin (IL); Uri Korogodsky, Ramat Gan (IL)

(73) Assignee: Fourier Optics Ltd, Ramat Gan (IL)

( * ) Notice: Subject to any disclaimer, the term of this patent is extended or adjusted under 35 U.S.C. 154(b) by 546 days.

(21) Appl. No.: 18/055,156

(22) Filed: Nov. 14, 2022

(65) Prior Publication Data

US 2023/0152588 A1    May 18, 2023

Related U.S. Application Data

(60) Provisional application No. 63/345,922, filed on May 26, 2022, provisional application No. 63/362,130, (Continued)

(51) Int. Cl.
*G02B 27/01* (2006.01)
*G02B 5/18* (2006.01)
*G02B 17/08* (2006.01)

(52) U.S. Cl.
CPC ....... *G02B 27/0172* (2013.01); *G02B 5/1814* (2013.01); *G02B 5/1866* (2013.01); (Continued)

(58) Field of Classification Search
CPC .. G02B 5/1814; G02B 5/1828; G02B 5/1866; G02B 17/08; G02B 2005/1804; (Continued)

(56) References Cited

U.S. PATENT DOCUMENTS

2005/0161436 A1*   7/2005  Yoshimura .........  B23K 26/0676
                                                    216/87
2020/0278487 A1*   9/2020  Calafiore ............  G02B 5/1857
                           (Continued)

FOREIGN PATENT DOCUMENTS

CN    111812842 A   10/2020
CN    112882228 A    6/2021

OTHER PUBLICATIONS

International Search Report for corresponding PCT/IL2022/051210 dated Feb. 15, 2023.
(Continued)

*Primary Examiner* — Jonathan Y Jung
(74) *Attorney, Agent, or Firm* — FisherBroyles, LLP; Roger L. Browdy; James E. Mrose

(57) ABSTRACT

An optical system is presented for use in a near-eye mixed reality system. The system comprises a relay system defining an eyebox of the optical system, said relay system being configured and operable to relay a virtual image light field from a light-engine onto an eye pupil plane while combining said virtual image with real-world light field. The relay system is configured as a free space relay system configured for free space propagation of said virtual image light field being relayed, said free space relay system comprising at least one off-axis 4f-system. Each of said at least one off-axis 4f-system comprises at least one lens formed from at least one resonance-domain surface relief diffractive optical element (SRDOE) operable for combining said virtual image light field with the real-world light field, said at least one SRDOE being configured with a predetermined global surface relief pattern characterized by global variation of at least some of pattern parameters across said SRDOE.

33 Claims, 32 Drawing Sheets
(16 of 32 Drawing Sheet(s) Filed in Color)

Related U.S. Application Data filed on Mar. 30, 2022, provisional application No. 63/317,986, filed on Mar. 9, 2022, provisional application No. 63/279,116, filed on Nov. 14, 2021.

(52) U.S. Cl.
CPC ...... *G02B 17/08* (2013.01); *G02B 2005/1804* (2013.01); *G02B 2027/0178* (2013.01)

(58) Field of Classification Search
CPC ........ G02B 2027/0178; G02B 27/0172; G02B 2027/0123; G02B 2027/0174
See application file for complete search history.

(56) References Cited

U.S. PATENT DOCUMENTS

| | | | | |
|---|---|---|---|---|
| 2020/0400951 | A1* | 12/2020 | Zhang | G02B 6/0016 |
| 2021/0247612 | A1* | 8/2021 | Hudman | G02B 5/18 |
| 2022/0350040 | A1* | 11/2022 | Lee | G02B 6/4206 |
| 2024/0154379 | A1* | 5/2024 | Adema | H04N 9/3129 |
| 2024/0418994 | A1* | 12/2024 | Glik | G02B 6/4206 |

OTHER PUBLICATIONS

He Min-Yang et al., "Compact and lightweight optical see-through holographic near-eye display based on holographic lens", Displays Devices, Dempa Publications, Tokyo, JP, vol. 70, Oct. 12, 2021.

Rolf R. Hainich et al., "NearEye Displays" In: "Displays: Fundamentals and Applications", Jul. 5, 2011 (Jul. 5, 2011), CRC Press, XP055505261, pp. 439-503.

Domingo M et al., "Achromatic Fourier Processor With Holographic Optical Lenses", Applied Optics, Optical Society of America, Washington, DC, US, vol. 40, No. 14, May 10, 2001 (May 10, 2001), pp. 2267-2274.

M. Hillenbrand, W. Singer, H. Munz, and N. Kerwien, See-Through Near to Eye Displays: Challenges and Solution Paths, 59th Ilmenau Scientific Colloquium, (Sep. 11-15, 2017).

C. Jang, K. Bang, S. Moon, J. Kim, S. Lee, and B. Lee, "Retinal 3D: Augmented reality near-eye display via pupil-tracked light field projection on retina," ACM Trans. Graph. 36(6), 1-13 (2017).

Paul V. Johnson, Jared AQ. Parnell, Joohwan Kim, Christopher D. Saunter, Gordon D. Love, and Martin S. Banks. 2016. Dynamic lens and monovision 3D displays to improve viewer comfort. Opt. Express 24, 11 (May 2016), 11808-11827.

Khorasaninejad, M. et al. Metalenses at visible wavelengths: diffraction-limited focusing and subwavelength resolution imaging. Science 352, 1190-1194 (2016).

M. A. Golub, A. A. Friesem, and L. Eisen, "Bragg properties of efficient surface relief gratings in the resonance domain," Opt. Commun. 235, 261-267 (2004).

Yurevich, Vladimir & Grimm, V. & Afonyushkin, A. & Yudin, K. & Gorny, Sergey. (2015). Optical design and performance of F-Theta lenses for high-power and high-precision applications. 10.1117/12.2190777.

O. Barlev and M. Golub, "Resonance domain surface relief diffractive lens for the visible spectral region," Appl. Opt. 52, 1531-1540 (2013).

O. Barlev and M. Golub, "Multifunctional binary diffractive optical elements for structured light projectors," Opt. Express 26, 21092-21107 (2018).

\* cited by examiner

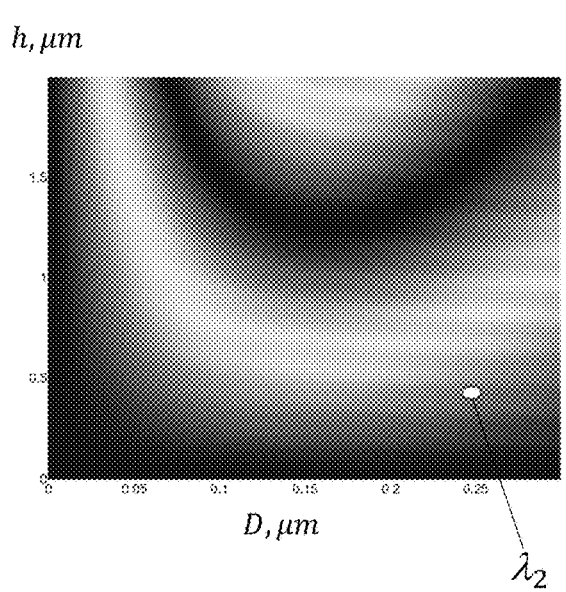
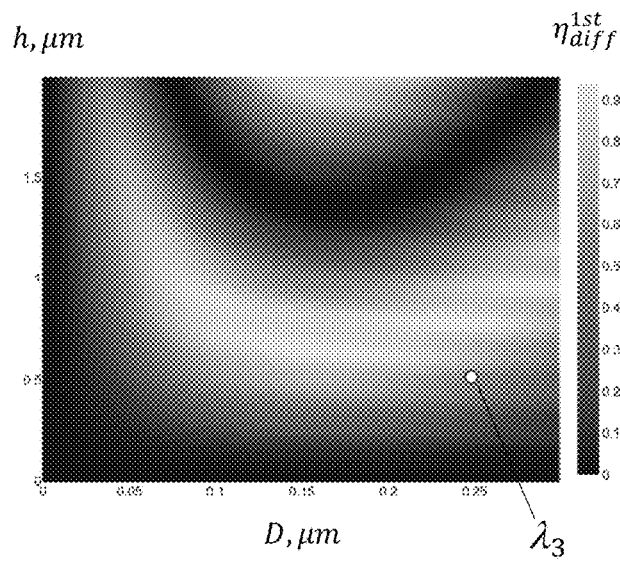
FIG. 5B
FIG. 5C

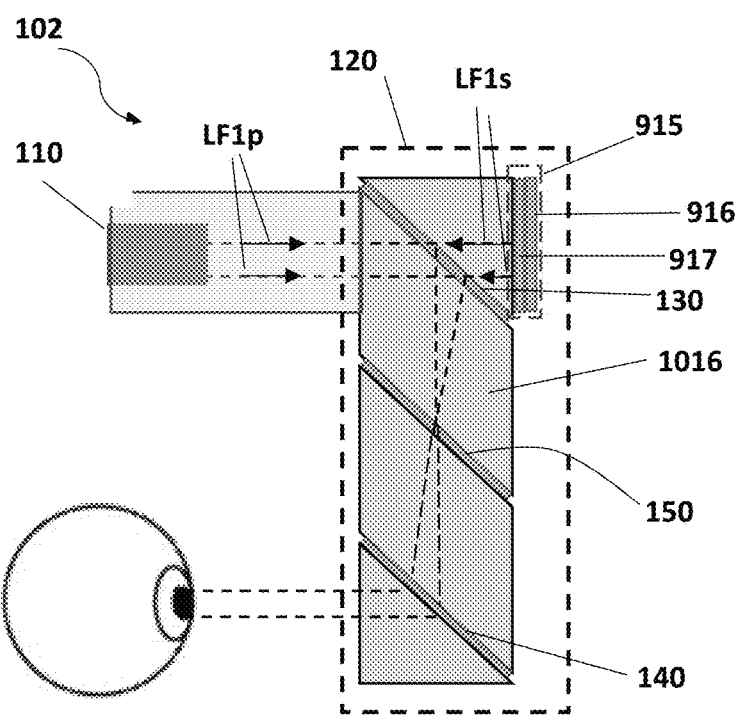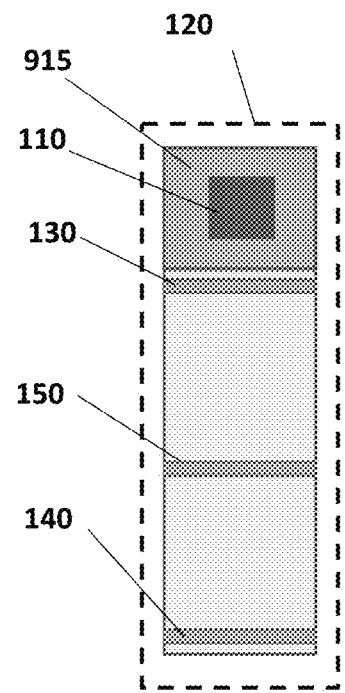
FIG. 12A                                    FIG. 12B

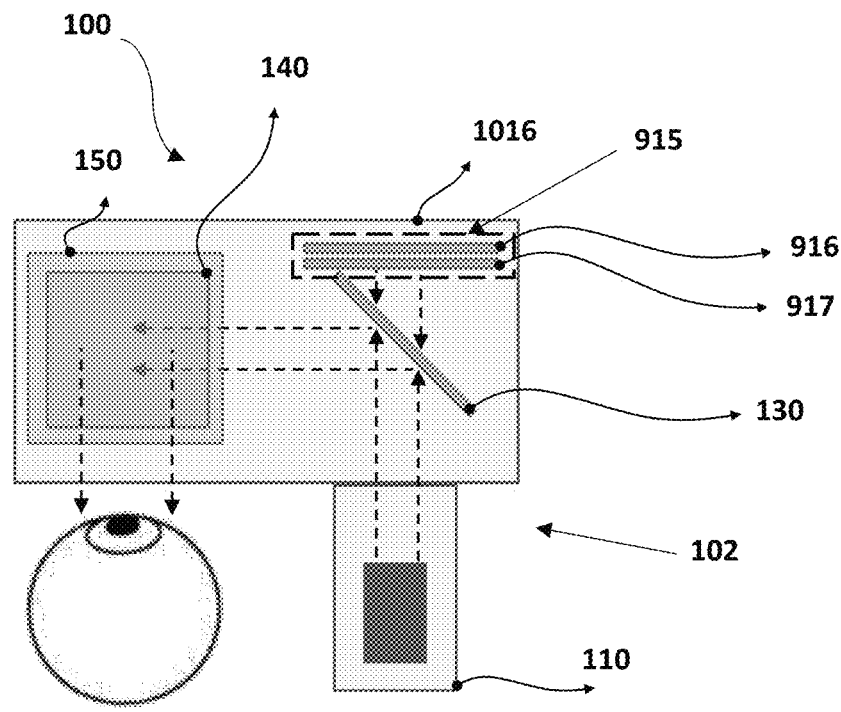
FIG. 13A
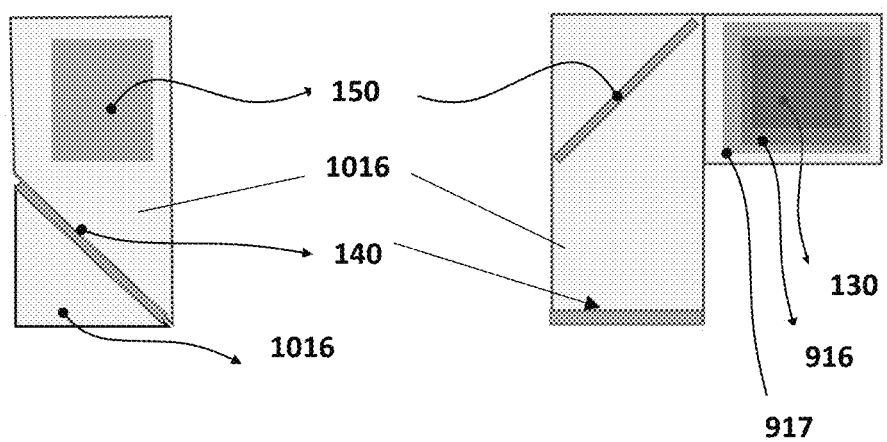
FIG. 13B
FIG. 13C

SYSTEM AND METHOD FOR OPTICALLY COMBINING VIRTUAL IMAGES INTO REAL WORLD SCENERY

TECHNOLOGICAL FIELD

The present invention relates to a system and method for optically combining virtual images into real-world scenery.

BACKGROUND ART

References considered to be relevant as background to the presently disclosed subject matter are listed below:
1. M. Hillenbrand, W. Singer, H. Munz, and N. Kerwien, See-Through Near to Eye Displays: Challenges and Solution Paths, 59th Ilmenau Scientific Colloquium, (11-15 Sep. 2017)
2. C. Jang, K. Bang, S. Moon, J. Kim, S. Lee, and B. Lee, "Retinal 3D: Augmented reality near-eye display via pupil-tracked light field projection on retina," ACM Trans. Graph. 36(6), 1-13 (2017).
3. Paul V. Johnson, Jared AQ. Parnell, Joohwan Kim, Christopher D. Saunter, Gordon D. Love, and Martin S. Banks. 2016. Dynamic lens and monovision 3D displays to improve viewer comfort. Opt. Express 24, 11 (May 2016), 11808-11827. DOI: http://dx.doi.org/10.1364/OE.24.011808
4. Khorasaninej ad, M. et al. Metalenses at visible wavelengths: diffraction-limited focusing and subwavelength resolution imaging. Science 352, 1190-1194 (2016).
5. M. A. Golub, A. A. Friesem, and L. Eisen, "Bragg properties of efficient surface relief gratings in the resonance domain," Opt. Commun. 235, 261-267 (2004).
6. Yurevich, Vladimir & Grimm, V. & Afonyushkin, A. & Yudin, K. & Gorny, Sergey. (2015). Optical design and performance of F-Theta lenses for high-power and high-precision applications. 10.1117/12.2190777.
7. O. Barley and M. Golub, "Resonance domain surface relief diffractive lens for the visible spectral region," Appl. Opt. 52, 1531-1540 (2013).
8. O. Barley and M. Golub, "Multifunctional binary diffractive optical elements for structured light projectors," Opt. Express 26, 21092-21107 (2018).

Acknowledgement of the above references herein is not to be inferred as meaning that these are in any way relevant to the patentability of the presently disclosed subject matter.

BACKGROUND

AR display technology can optically merge virtual information into the real world. It integrates virtual images and real environments. This technology has many applications in different fields, such as biomedicine, aviation, education, military, and entertainment. In a head mounted display (HMD), a display module consists of a light-engine, relay and combiner optics, and gaze tracking. The light-engine creates the virtual image light field, the imaging optics follow the gaze tracking instructions and relay that light field to the pupil and finally, the combiner optics combine the virtual and real light to the pupil. The optical combiner is responsible for combining virtual images into real-world scenery. It is one of the most challenging enablers for core AR technology. It needs to be light, compact, efficient, and transparent to the outside environment.

The optical combiner is often the most complex and most costly optical element in the entire HMD display architecture: it is the one component seen directly by the user and the one seen directly by the world. It often defines the size and aspect ratio of the entire headset. It is the critical optical element that reduces the quality of the see-through and the one that defines the field of view (FOV), resolution, and form factor of the system.

The eyebox is a term used to describe the area wherein the eye pupil may move and still perceive the full FOV. Thus, the eyebox being the ability of user's eye to effectively use/work with an AR/VR system (e.g. incorporated in HMD or glasses) is actually defined by the exit pupil of an optical system used in the AR/VR system. The eyebox is typically larger than the pupil's range of movement because it is required to support alignment tolerances and different inter-pupillary distances (IPD).

An optical invariant that is commonly called étendue in French is an indication of the complexity of the design required [1]. In HMD system, it is the product of the FOV and the eyebox area. In an 1D back-of-the-envelope calculation, it states that the optical system required to support an eyebox of 20 mm with a FOV of 60 degrees, which is a consensus of what is required is equivalent to that of a full frame photo lens at f-number of 2.

The most common solution for an optical combiner is a waveguide combiner. Waveguide combiner uses a method called "pupil replication" to increase the eyebox area and therefore the étendue of the system. However, pupil replication has inherent problems, e.g., (i) very low power efficiency since the entire eyebox is illuminated all the time rather than just the pupil area, and (ii) different optical path between the multiple pupils makes focus adjustment solution very difficult.

An alternative method for pupil replication is pupil steering [2], a scheme based on a gaze tracker. Such steering matches the exit pupil of the relay and combiner optics to the human eye pupil at all times so that the user experiences full FOV vision no matter where he or she looks. The most significant difference between pupil steering and pupil replication is that the latter illuminates the entire eyebox and most of the light does not enter the pupil leading to high loss rate.

A desired feature in AR display is tunable focal (varifocal) [3] distance of the virtual image. It is usually controlled by using a tunable lens in the light engine. If the vergence, i.e., a simultaneous movement of both eyes in opposite directions, and accommodation (eye focus) do not match in displaying a virtual image in three-dimensions (3D), then nausea is experienced. This mismatch or conflict is usually referred to as the vergence-accommodation conflict (VAC).

GENERAL DESCRIPTION

There is a need in the art of augmented reality technologies (near-eye mixed reality technologies) for a novel approach which provides desirably high FOV and desirably small form factor, while allowing control over wavefront curvature, amplitude, and polarization of the light field of virtual image while being superimposed on real scene.

Widespread refractive optics have inherent restrictions and have limited control over wavefront curvature, amplitude, and polarization. Specifically, they are limited in aberration correction in off-axis optical configurations. Reflective optics (mirrors) do not suffer from chromatic aberration. However, they have limited optical performance, because they are limited in the number of surfaces and their free-form surface is hard to implement.

Classical "scalar" diffractive optical elements (DOEs) such as zone plates have restrictions in numerical aperture (NA) and diffraction efficiency. Nanotechnologies have rapidly advanced in the last decade and enabled new types of optical elements, such as Metalenses, which overcome the usual restrictions of scalar DOEs [4]. In particular, Bragg DOEs have a period comparable to the wavelength (known as "resonance domain DOE"), feature Bragg angles, tens of degrees angular separation between diffraction orders, high diffraction efficiency, fast focusing with high NA, tailored aberrations, and polarization control [5]. Most of the energy of the incident beam is converted into a single diffraction order, typically the first diffraction order. Their fabrication as binary diffractive structures on fused silica (FS) are compatible with techniques that are well-established in the semiconductor industry.

Such Bragg DOEs have been demonstrated as diffractive lenses and beam shapers. Their ability to impose a computer-generated phase on the first diffraction order was demonstrated in [7] whereas, their ability to impose a superposition of optical functions such as, beam shaping, beam splitting and focusing power was demonstrated in [8]. However, these properties were limited to small diffraction angles of roughly ten degrees.

The present disclosure provides a novel optical system for use in a near-eye mixed reality system. This system utilizes a free space relay system (rather using waveguide-based approach) which includes one or more off-axis 4f-systems (advantageously providing 1:1 imaging conditions), where the off-axis 4f-system includes at least one surface relief diffractive optical element (SRDOE). The SRDOE is an optical element having a global surface relief pattern configured to apply a predetermined optical phase function to light field passing therethrough. Such relay system is configured and operable to relay a virtual image light field (from a light-engine) onto an eye pupil plane while combining the virtual image with the real-world scenery. This configuration enables the optical system to have a desirably large eyebox, as well as large FOV while keeping small size (form factor) of the optical system.

Thus, according to one broad aspect of the present disclosure, it provides an optical system for use in a near-eye mixed reality system, comprising: a relay system defining an eyebox of the optical system, said relay system being configured and operable to relay a virtual image light field from a light-engine onto an eye pupil plane while combining said virtual image with real-world light field; wherein said relay system is configured as a free space relay system configured for free space propagation of said virtual image light field being relayed, said free space relay system comprising at least one off-axis 4f-system; and wherein each of said at least one off-axis 4f-system comprises at least one lens formed from at least one resonance-domain surface relief diffractive optical element (SRDOE) operable for combining said virtual image light field with the real-world light field, said at least one SRDOE being configured with a predetermined global surface relief pattern characterized by global variation of at least some of pattern parameters across said SRDOE.

The at least some parameters of the SRDOE may include two or more of the following: period, line width, etching depth, slant angle, and side wall angle.

The SRDOE of the present disclosure is configured to be operable in a Bragg regime with first and second dominant diffraction orders, wherein the first dominant diffraction order is a first diffraction order, and the second dominant diffraction order is a zeroth diffraction order for which the SRDOE is substantially transparent. For example, the SRDOE, which is operable for combining said virtual image light field with the real-world light field, is configured with the first and second dominant diffraction orders for, respectively, the virtual light field and the real-world light field.

Preferably, each SRDOE is configured as a wavelength and polarization selective lens for each of at least one selected wavelength and selected polarization state.

Preferably, the SRDOE is configured such that said first and second dominant diffraction orders correspond to ranges of polar ($\theta_{diff}$) and azimuthal ($\phi_{diff}$) diffraction angles, each ranges being 10-80 degrees.

Preferably, the global surface relief pattern of the SRDOE is formed from a continuous two-dimensional arrangement of unit cells, where each unit cell is configured as a surface relief diffraction grating (SRDG) having locally unchanged values of said at least some parameters across the SRDG.

In some embodiments, the SRDOE is configured such that one of said first and second dominant diffraction orders thereof diffracts more than 90% of the light field at each of said at least one selected wavelength and selected polarization state. For example, the second dominant diffraction order, being the zeroth order, is said one of the first and second dominant diffraction orders diffracting more than 90% of the light field; and/or the diffraction efficiencies of said first dominant diffraction order and said second dominant diffraction order, being the zeroth diffraction order, are, respectively, 10% and 90%, thereby providing high transparency of the SRDOE.

In some other embodiments, the SRDOE is configured such that diffraction efficiencies of said first and second dominant diffraction orders are substantially the same, each being about 50% for the light field at each of the at least one selected wavelengths and selected polarization state.

The SRDOE is preferably configured such that the second dominant diffraction order, being zeroth diffraction order, is essentially transmitting for the light field incident thereon having light components other than said at least one selected wavelength and selected polarization state.

The lens, formed from the at least one SRDOE, can be made of one of the following materials: fused silica (FS), silicon nitride (Si3N4), titanium dioxide (TiO2), Epoxy resins, glass, plastic.

In some embodiments, the SRDOE is located on a surface of a substrate, which may be made of fused silica (FS).

In some embodiments, said at least one lens formed from the at least one SRDOE comprises a stack of two or more SRDOEs configured for selected two or more different wavelengths of a visible spectral range. For example, the stack of SRDOEs comprises three SRDOEs configured for selected wavelengths of red, green, and blue spectra, respectively; and/or said stack comprises an additional SRDOE configured for a selected wavelength in an infrared spectral region.

In some embodiments, said at least one off-axis 4f-system comprises the off-axis 4f-system having a first lens exposed to the light field from the light engine and a second lens combining the virtual light field and the real world light field to propagate to the eyebox, wherein said second lens is said at least one lens formed by the at least one SRDOE being at least one second SRDOE. In some configurations, the first lens of the off-axis 4f-system is configured as a mirror with converging optical power.

In another possible configuration, the first lens is formed by at least one second SRDOE having a second predetermined global surface relief pattern different from the predetermined global surface relief pattern of the at least one first SRDOE. For example, the system may further comprise a polarization control assembly comprising a quarter waveplate accommodated in an optical path of light transmitted by the first lens, and a reflector redirecting light output of the quarter waveplate to pass back therethrough, thereby providing 90-degree polarization rotation of the virtual light field propagating back to be diffracted by the first lens. Also, in some additional or alternative examples, the first and second lenses of the off-axis 4f-system may comprise, respectively, first and second stacks of the first and second SRDOEs, each stack comprising two or more SRDOEs configured for selected two or more wavelengths of a visible spectral range, and possible also comprises an additional SRDOE configured for a selected wavelength in an infrared spectral region.

In some embodiments, the at least one off-axis 4f-system comprises the off-axis 4f-system having an optical element accommodated in an intermediate image plane of the off-axis 4f-system. For example, such optical element is configured as at least one of the following: an aberration corrector, a beam expander, and a beam reflector; or may be to configured as a dispersion corrector. The optical element in the intermediate image plane may include a light interacting surface configured as any one of: Metasurface, diffractive or refractive element.

In some embodiments, the relay system comprises two of said off-axis 4f-systems, wherein first lenses of the two 4f-systems receive virtual light fields from two, respective light engines, and second lenses of the two 4f-systems define the eyebox of the relay system.

In some embodiments, the free space relay system comprises an additional off-axis 4f-system, such that the relay system thereby defines an off-axis 8f-system.

The present disclosure, in its another broad aspect, provides a near-eye mixed reality system comprising: a projector unit comprising at least one light engine and at least one scanner; and the optical systems configured according to any one of the preceding claims.

In yet another broad aspect, the present disclosure provides an augmented reality system comprising a pair of near-eye mixed reality systems in association with left and right eyes of a user, where each of the near-eye mixed reality systems has any of the above described configurations or variations thereof.

The present disclosure also provides augmented reality glasses comprising left and right glass lenses within a glasses' frame, and comprising first and second near-eye mixed reality systems associated with the left and right glass lenses, where each of the first and second near-eye mixed reality systems is configured as described above. It should be understood that the term "glass lens" relates to a lens used in glasses and is not limited to the lens material; it may be made of glass or plastic.

In some embodiments, at least a part of each of first and second relay systems of the first and second near-eye mixed reality systems, respectively, is integral with a respective one of the left and right glass lenses. Alternatively, or additionally, each of first and second projector units of the first and second near-eye mixed reality systems, respectively, is located on a part of the glasses frame or on a glasses temple in a vicinity of a respective one of the left and right glass lenses.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting examples only, with reference to the accompanying drawings, in which:

FIGS. 2A to 2B show diagrams of SRDOE composed of multiple laterally adjacent SRDGs, wherein FIG. 2A shows the definition of the lateral (x, y) coordinates of the SRDOE and the local (x, y) coordinates of a specific SRDG within the SRDOE; and FIG. 2B shows in detail a single SRDG of the SRDOE;

FIGS. 2C to 2F show diagrams of some non-limiting examples of the surface relief diffractive optical elements (SRDOEs) according to the present disclosure, wherein FIG. 2C shows a perspective view of a binary surface relief diffracting grating (SRDG) including the incident and diffracted rays; FIGS. 2D and 2E show the cross sections of binary (FIG. 2D) and slanted (FIG. 2E) SRDGs, respectively; and FIG. 2F shows a top view of a SRDG;

FIGS. 3A to 3D show results of RCWA numerical calculations of SRDOEs according to the principles of the present disclosure, wherein FIG. 3A shows the calculated first order diffraction efficiency and polar diffraction angle as a function of grating period for a fixed fill factor; FIG. 3B shows the calculated first order diffraction efficiency as a function of fill factor and grating period. The solid line denotes the optimal (i.e., maximum efficiency) fill factor for each grating period; FIG. 3C shows the calculated first order diffraction efficiency and polar diffraction angle as a function of grating period for a variable fill factor; and FIG. 3D shows the calculated first order diffraction efficiency with optimized fill factor parameter demonstrating high efficiency for a wide range of polar and azimuthal diffraction angles, $\theta_{diff}$ and $\phi_{diff}$, respectively;

FIGS. 5A to 5C show, respectively, RCWA numerical calculations of first order diffraction efficiency of SRDG for three wavelengths: 632 nm (FIG. 5A), 520 nm (FIG. 5B), and 450 nm (FIG. 5C) demonstrating orthogonality in polarization and wavelengths of the incident beam;

FIG. 7B shows a two-color relay system with a third element providing dispersion correction;

FIGS. 9B and 9C present ZEMAX calculations of the respective exemplary systems;

FIGS. 12A and 12B show, respectively, a side view and a front view of an exemplary optical system configured as a module that can be attached to/incorporated in virtual/augmented reality glasses, wherein the systems are configured to enable the light engine to be on the same side as the eyebox;

FIGS. 13A to 13C show, respectively, the top, side, and front views of the exemplary optical system according to the present disclosure configured to provide folded propagation path, allowing compact design of the system;

DETAILED DESCRIPTION OF EMBODIMENTS

Figure 1:
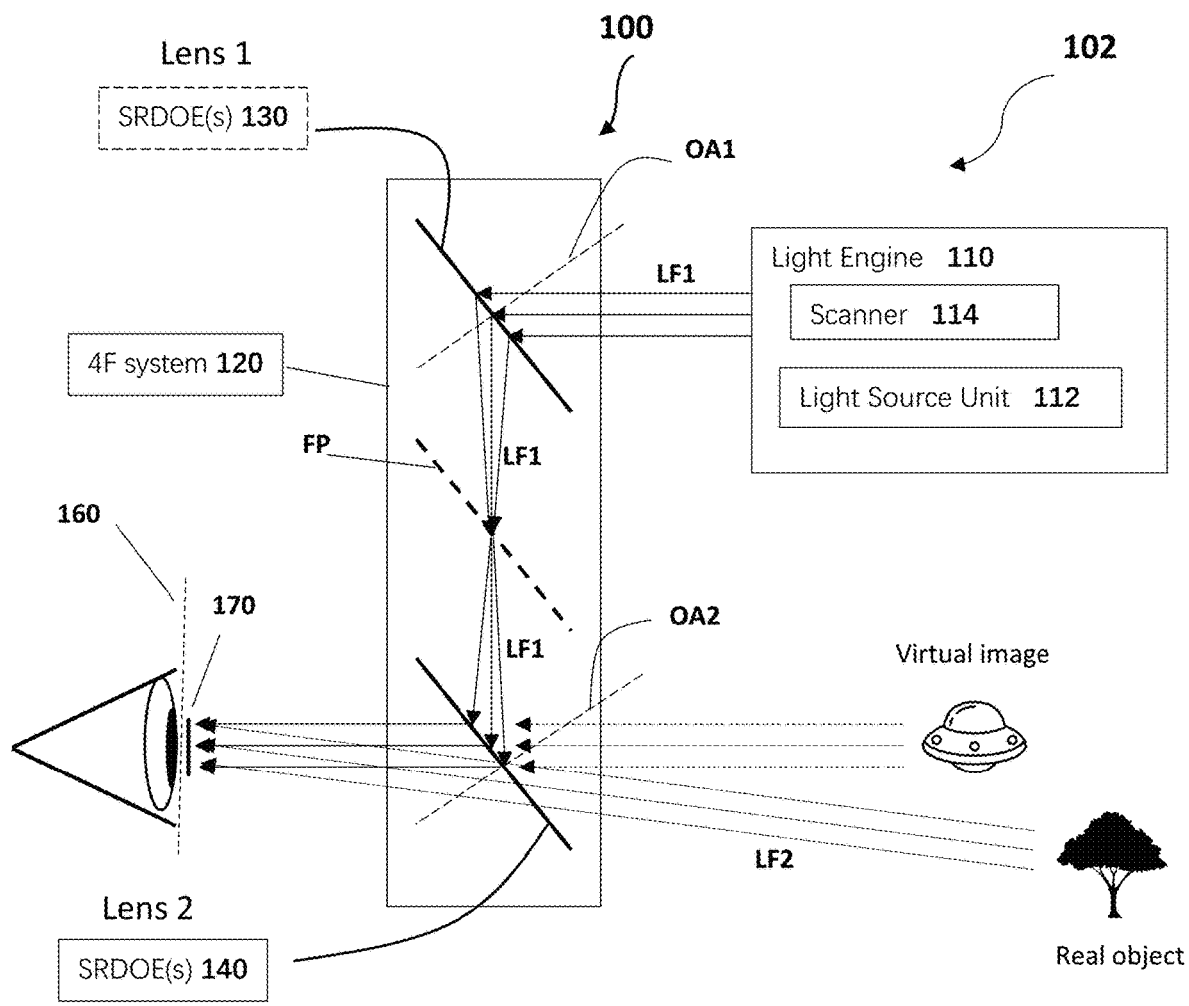
FIG. 1 shows schematically an optical system for use in a near-eye mixed reality system according to the principles of the present disclosure.

Reference is made to FIG. 1 exemplifying schematically a near-eye mixed reality system 102 including an optical system 100 configured and operable according to the principles of the present disclosure. The optical system 100 includes a relay system 120 which is configured and operable to relay a virtual image light field LF1 from a light engine system 110 onto an eye pupil plane 160 and defining an eyebox 170 of the optical system 100 and thus of the entire system 102.

The near-eye mixed reality system 102 includes inter alia the light engine 110 which operates to project the virtual image light field LF1 onto a light receiving element of the optical system 100 (i.e., relay system). The light engine system 110 includes a light source unit 112 which is in data communication with a virtual image generator (not shown) and creates the corresponding light field LF1. This can be implemented by generating light beams indicative of data provided by the image generator and using a scanner unit 114 which scans this light beam to create the output light field LF1. The light engine system 110 is thus capable of creating the virtual image light field, e.g., by scanning a laser beam with a scanning mirror. The construction and operation of the light engine system may be of any known suitable type, and does not form part of the present disclosure, and therefore need not be described in more details.

The relay system 100 is configured according to the present disclosure as a free space relay system configured for free space propagation of the virtual image light field LF1 while combining the virtual image light field LF1 with real world light field LF2 providing thus a mixed reality experience to the viewer. The relay system 100 includes at least one off-axis 4f-system 120 providing two main functionalities: (i) optical relay and (ii) optical combiner.

The off-axis 4f-system 120 includes first and second lenses Lens 1 and Lens 2. In this connection, the following should be noted.

Typical 4f-system is an essence of optical relay and usually consists of two lenses, where the input plane of the 4f-system is one focal length in front of Lens 1 while the output plane is located one focal length after Lens 2. An intermediate image plane between the two lenses is a Fourier plane FP. The use of 4f-system advantageously relays complex wavefront information, meaning that not only the amplitude but also phase information of the light field is relayed. Relaying such information enables relaying diverging and converging beams into the pupil which beams correspond to virtual images at different focal locations, which alleviates such critical phenomenon in mixed-reality systems as Vergence-Accommodation Conflict (VAC), which is a visual phenomenon that occurs when the brain receives mismatching cues between vergence and accommodation of the eye (effect that is unpleasant and causes eye strain). Also, the use of such 4f system relay is suitable for pupil steering.

The 4f-system 120 used in the relay system of the present disclosure is configured as off-axis system, i.e., in which optical axes OA1 and OA2 of the lenses do not coincident with light propagation paths on and through said lenses. This provides more flexibility of orientation of light propagation paths and thus more compact design of the optical system.

Further, in such off-axis 4f-system 120, configured according to the present disclosure, at least one of the lenses, being the lens defining the output aperture of the system 120, and thus defining the eyebox of the relay system 100, is formed from at least one resonance-domain surface relief diffractive optical element (SRDOE). Thus, in the illustration in the figure, at least Lens 2 is formed of at least one SRDOE 140. As also exemplified in the figure, the other lens, Lens 1 (i.e., input aperture of the system 120), may also be formed of at least one SRDOE 130.

The SRDOE 140 (and possibly also 130) has a predetermined global surface relief pattern with global variation of at least some of pattern parameters across the SRDOE. The pattern is selected (optimized) in order to enable significantly increase numerical aperture of light collection by the lens of a given size (without a need to increase the number of lenses and their thicknesses). It should be noted that such features are important for near-eye mixed reality system, in particular incorporated in glasses.

The SRDOE is configured and operable for optimizing the optical combining of the virtual image light field LF1 with the real-world light field LF2. According to the technique of the present disclosure, the SRDOE 140 (130) is configured with first and second dominant diffraction orders, being respectively the first diffraction order and the zeroth diffraction order.

The SRDOE is generally operable in a Bragg regime. However, the SRDOE is not configured as a typical Bragg grating. In this connection, the following should be noted. Bragg grating configuration and operation are well defined by grating diffraction theory (represented by the well-known equation of Bragg angle).

The term "Bragg regime" used herein to describe the operational principles of the SRDOE's pattern relates to diffraction by a relatively "thick" and "volumetric" grating structure, i.e., presence of first and second dominant diffraction orders being respectively the first diffraction order and the zeroth diffraction order (representing the entirely transmitted light field), while the pattern of the SRDOE of the present disclosure is actually a surface relief (being neither thick nor volumetric) in the resonance domain. Specifically, the surface relief grating in the resonance domain behaves similarly to a volume grating with graded refractive index, where certain degree of Bragg conditions is satisfied. Hence, the term "Bragg regime" in relation to the SRDOE of the present disclosure should be interpreted correctly and not confused with a Bragg grating.

The SRDOE described above is formed from a continuous two-dimensional arrangement of unit cells, where each unit cell presents a local surface relief pattern, such that the entire arrangement of the unit cells forms the global surface relief pattern of the SRDOE. As indicated above, the SRDOE has the predetermined global surface relief pattern with global variation of at least some of pattern parameters across the SRDOE. The unit cell (being a cell or basic block of the global surface relief pattern) is configured as a resonance-domain surface relief diffraction grating (SRDG) having locally unchanged values of said at least some of the pattern parameters across the unit cell.

In contrast to scalar domain gratings, which suffer from higher diffraction orders accompanying the first diffraction order which unavoidably results in ghost images being formed, the SRDOE configured according to the principles of the present disclosure is configured with only two dominant diffraction orders, as described above. The scalar domain is also restricted to low spatial frequency of pattern features and small diffraction angles, leading to low numerical aperture (NA) of available diffractive lenses. In the resonance domain, where the grating period is comparable to the wavelength, high diffraction angles may be achieved, as will be described in detail below. It is noted that for surface relief gratings in the resonance domain, the diffraction efficiency of the first diffraction order can reach 100%.

Hence, implementing the off-axis 4f-system based relay with at least one lens being formed from at least one resonance domain SRDOE provides for significantly improving the relay operational properties which are important for near-eye mixed reality applications.

Reference is made to FIGS. 2A to 2G schematically exemplifying the principles of configuring the SRDOE 600 for the purposes of the present disclosure, i.e., with global variation of at least some parameters of a surface relief pattern 602.

The surface relief pattern of the SRDOE is in the form of spaced-apart features (generally termed "grating lines") and is typically characterized by such parameters as period, line width, fill factor (ratio between the line width and period), height, slant angle, grating vector and side wall angle. The global surface relief pattern of the SRDOE is characterized by global variation of at least some of the pattern parameters.

Figure 2A:
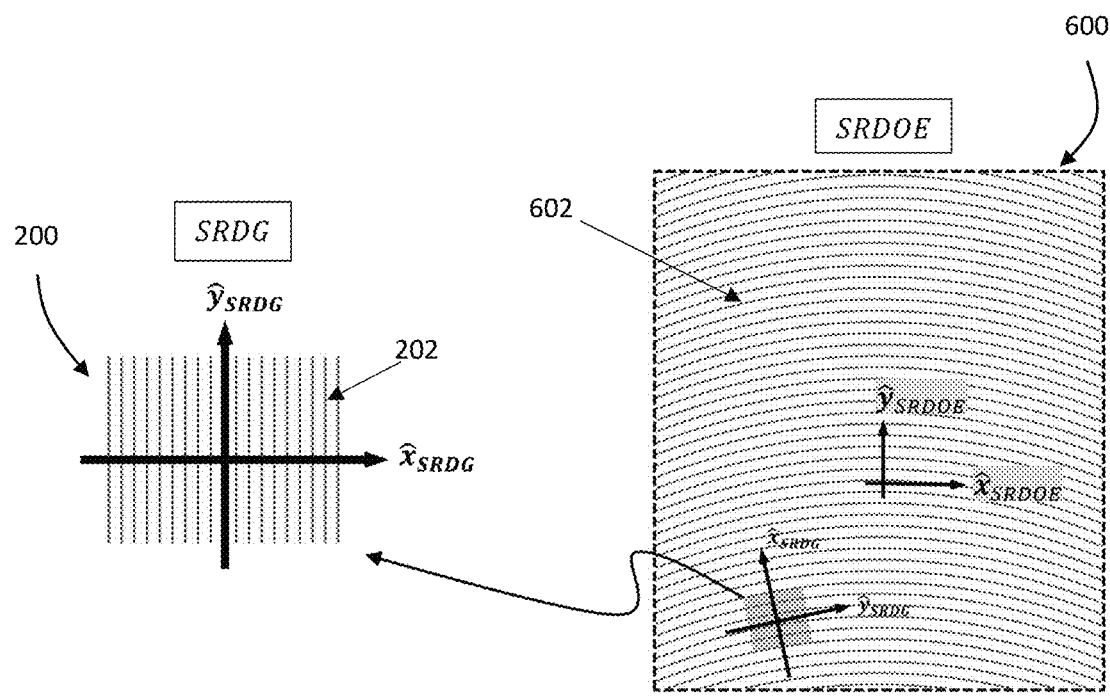

As shown in FIG. 2A, in the present not limiting example, the SRDOE is configured with grating vector variation across the global coordinates ($\hat{x}_{SRDOE}, \hat{y}_{SRDOE}$) belonging to the surface of SRDOE 600. As described above, the global surface relief pattern 602 is formed from local surface relief patterns 202 of a continuous two-dimensional arrangement of unit cells 200. The unit cell 200 is configured as surface relief diffraction grating (SRDG) formed by the local pattern 202 having locally unchanged values of said at least some parameters across the local coordinates ($\hat{x}_{SRDG}, \hat{y}_{SRDG}$) belonging to the surface of a particular SRDG.

Figure 2B:
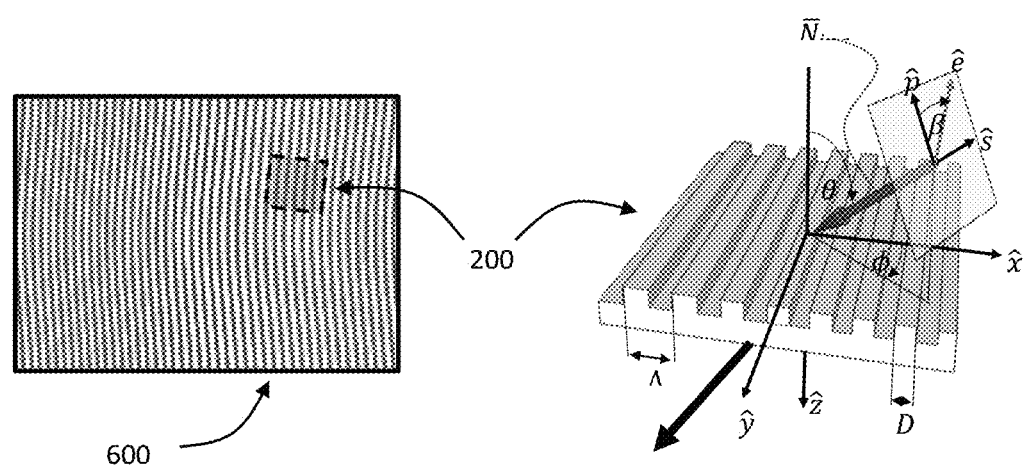

FIG. 2B shows the SRDOE 600 and shows more specifically a magnified microstructure of the exemplary SRDG 200 (indicated by a dashed square on SRDOE 600) which structure will be described in detail further below with reference to FIG. 2C.

FIGS. 2C to 2F more specifically describe structural and operational features of the SRDG (unit cell local pattern) according to the present disclosure. In general, the pattern features/parameters of the SRDG and arrangement of the SRDGs (relative orientation of each two neighboring SRDGs) forming the SRDOE are selected/optimized such that each interaction location (x, y) on the SRDOE with incident light field/beam (i.e., light beam interaction with corresponding SRDGs) properly affects the light field propagation direction with high diffraction efficiency (in the desired diffraction order).

Figure 2C:
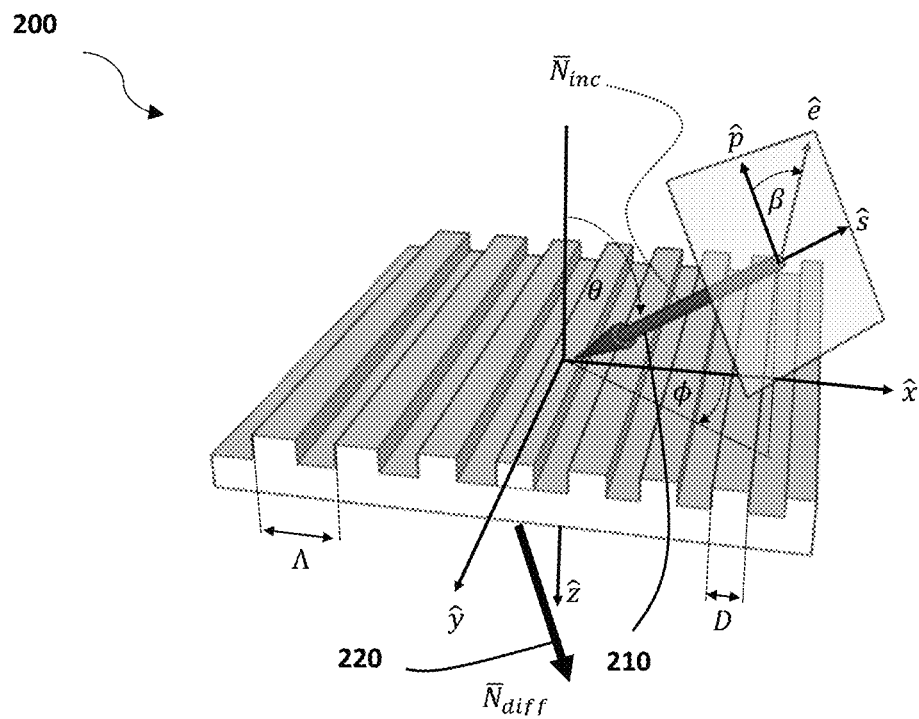
Figure 2D:
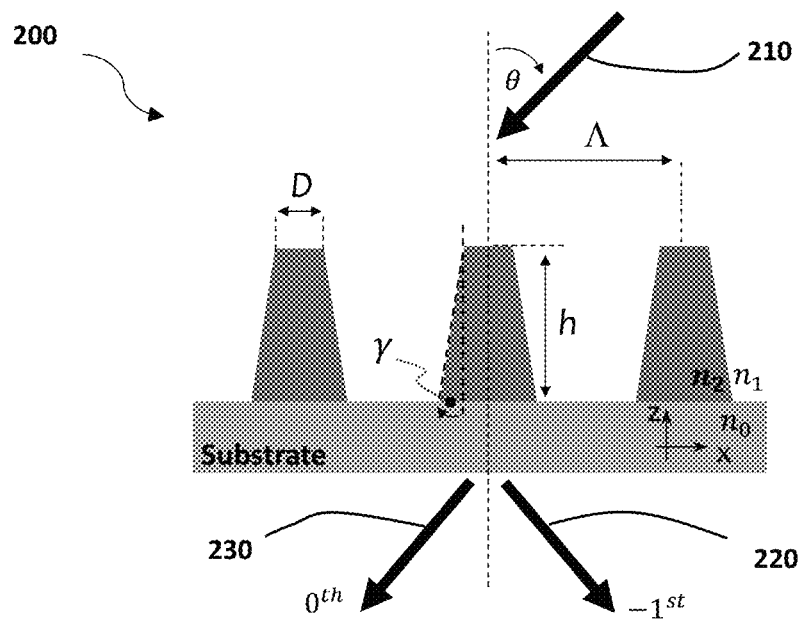
Figure 2E:
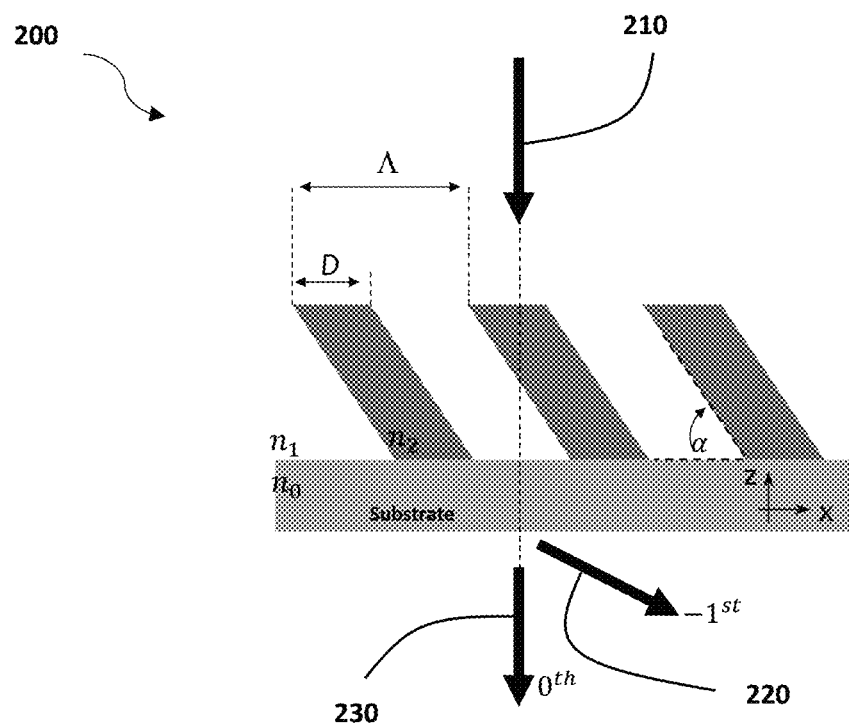
Figure 2F:
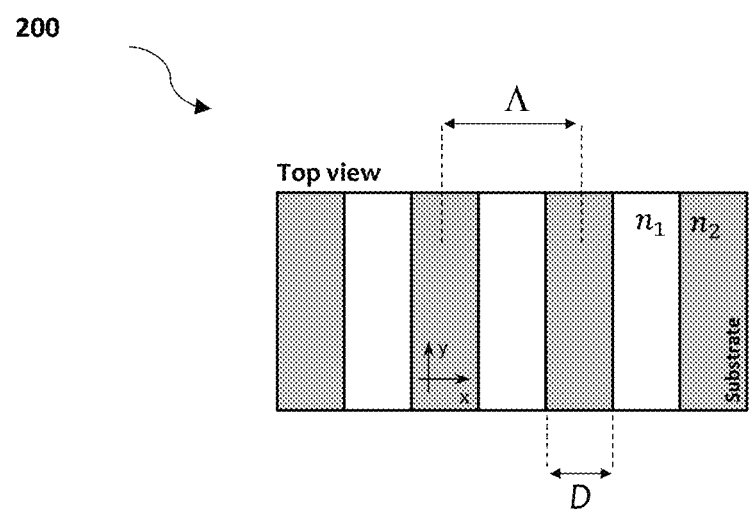
Figure 2G:
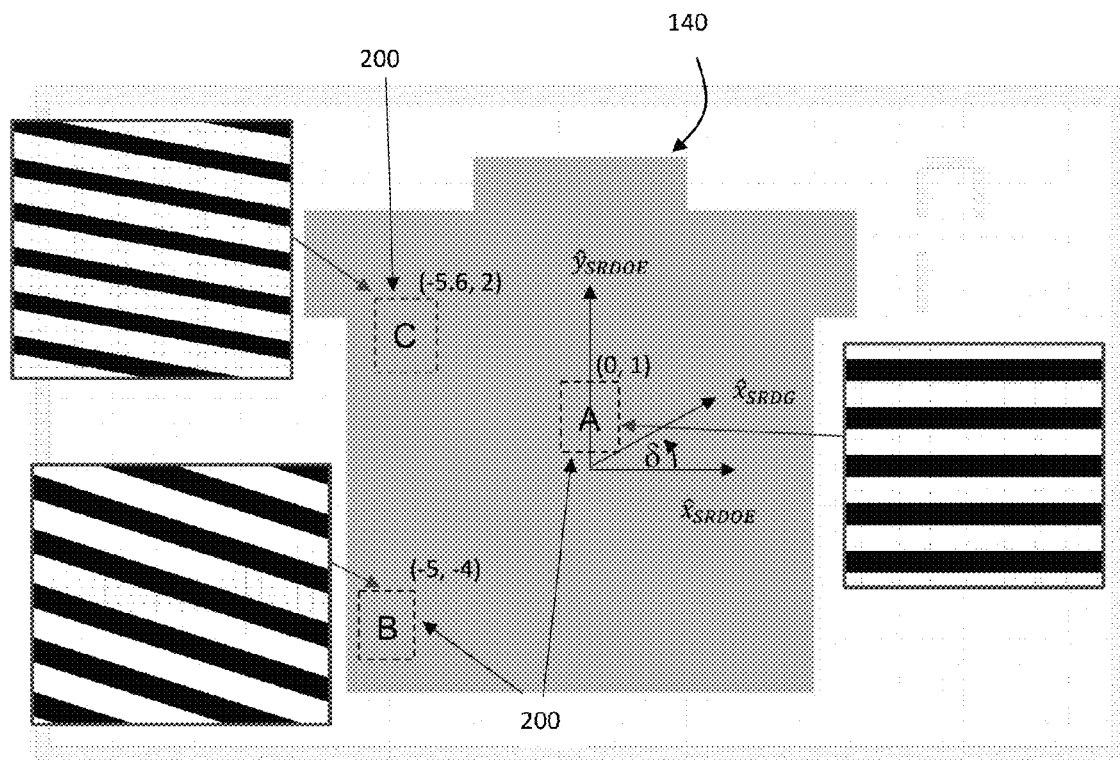
FIG. 2G shows a diagram of an exemplary SRDOE, serving as the second lens in off-axis 4f-system (i.e. combiner lens), configured according to the principles of the present disclosure, exemplified as being designed for an illuminating wavelength of 450 nm and p-polarization.

The figures exemplify unit cells (SRDGs), which in these non-limiting examples, have a binary pattern configuration (including straight side walls as in FIGS. 2C and 2D; and slanted side walls as in FIG. 2E). FIG. 2C shows a perspective view of the SRDG; FIGS. 2D and 2E show cross-sectional views; FIG. 2F shows a top view; and FIG. 2G shows a specific not limiting example of designing/optimizing of the configuration (parameters) of SRDGs and SRDOE formed thereby.

The SRDG 200 is characterized by such pattern parameters as a period $\Lambda$, line width D, fill factor $$\frac{D}{\Lambda},$$

etching height (depth) h, slant angle $\alpha$, side wall angle $\gamma$, and grating vector $\bar{v}$. At least some of such pattern parameters of SRDOE 600 are varying across the SRDOE, i.e., these parameters while being constant for each unit cell are different for at least some of the unit cells.

Thus the SRDOE parameters may include the following: fill factor ($x_{SRDOE}, y_{SRDOE}$), h($x_{SRDOE}, y_{SRDOE}$), $\Lambda(x_{SRDOE}, y_{SRDOE}$) grating vector $\bar{v}(x_{SRDOE}, y_{SRDOE}$), and $\alpha(x_{SRDOE}, y_{SRDOE}$), where two or more of them may be varying across the SRDOE.

The grating vector $\bar{v}$ and polarization of the diffracted rays at each interacting point on SRDOE may be determined by local SRDG's parameters. It should be noted that the grating vector $\bar{v}$ is proportional to the first order phase φ gradient. The magnitude of the grating vector is inversely proportional to the grating period Λ and the direction of the grating vector constitutes the grating's orientation.

The SRDOE (and thus SRDG 200) is typically formed on a surface of an optically transparent, dielectric substrate as indicated in FIGS. 2D and 2E. The substrate may for example be made of fused silica (FS). The diffractive layer in which the diffractive structures are formed (grating lines) may for example be made of any of the following materials: FS, silicon nitride ($Si_3N_4$), $TiO_2$, Epoxy resins, glass, plastic. Materials such as $Si_3N_4$, $TiO_2$ may be deposited on a substrate.

The substrate material is characterized by its refractive index no, media (background) between the substrate and the pattern features (grating lines) has refractive index $n_1$, and material of the pattern features (grating lines) has refractive index $n_2$. Thus, the materials of the substrate, background, and grating lines defining properties of the SRDG are characterized by refractive indices $n_0$, $n_1$, $n_2$, respectively.

As shown in FIG. 2C, the SRDG 200 lies in plane z=0 of the coordinate system x, y, z with unit vector $\hat{x}$, $\hat{y}$, $\hat{z}$, whereas the grating vector $\bar{v}$ is aligned with the unit vector $\hat{y}$.

Each of FIGS. 2C to 2E shows an incident ray $\bar{N}_{inc}$ 210 and a diffracted ray $\bar{N}_{diff}$ 220, and the non-diffracted zeroth order ray 230 is shown in FIGS. 2D and 2E. The vector $\bar{N}_{inc}$ (210) denotes the incident ray's direction and is characterized by polar and azimuthal angles of incidence θ, φ, polarization vector ê, and polarization angle β with respect to polarization direction of $\hat{p}$, $\hat{s}$. Note that β=0° corresponds to p-polarization (i.e., electric field of incident beam is polarized parallel to the plane of incidence) and β=90 corresponds to s-polarization (i.e., electric field of incident beam is polarized perpendicular to the plane of incidence). The following are relationships and definitions using the notations introduced above:

$$\bar{N} = N_x \cdot \hat{x} + N_y \cdot \hat{y} + N_z \cdot \hat{z},$$
$$|\bar{N}| = 1$$
$$\cos\theta = \bar{N} \cdot \hat{z}$$
$$\cos\theta\cos\phi = \bar{N} \cdot \hat{x}$$
$$\cos\theta\sin\phi = \bar{N} \cdot \hat{y}$$
$$\hat{s} = \frac{\hat{z} \times \bar{N}}{|\hat{z} \times \bar{N}|}$$
$$\hat{p} = \hat{s} \times \bar{N}$$
$$\cos\beta = \hat{e} \cdot \hat{p}$$
$$\sin\beta = \hat{e} \cdot \hat{s}$$

The Bragg phenomena of peak diffraction efficiency occurs when $$\sin(\theta) = \frac{\lambda}{2\Lambda} \quad (1)$$

where λ is the illuminating wavelength, and Λ is the grating period.

As will be described below, the inventors have found that "Out of Bragg" diffraction efficiency (i.e., diffraction not satisfying Eq. (1)) can remain relatively high (close to 90%) by properly selecting the fill factors, each being determined as $$\frac{D}{\Lambda}$$

(where Λ is the period, and D is the line width). The inventors have also found that a proper selection of grating vector $\bar{v}$ can maintain Bragg condition for large azimuthal diffraction angles. This will also be described more specifically further below.

It should be understood that the diffracted ray $\bar{N}_{diff}$ is controlled by the grating vector $\bar{v}$ while the magnitude of the grating vector controls the polar angle of diffraction $\theta_{diff}$, and the direction of the grating vector V controls the azimuthal angle of diffraction $\phi_{diff}$. The corresponding equations are detailed below.

The direction of the diffracted ray $\bar{N}_{diff}$ 220 is controlled via the grating vector $\bar{v}$ (spatial frequency of grating lines):

$$\bar{v} = v_x\hat{x} + v_y\hat{y}$$

where $v_x$ and $v_y$ are given by $$\lambda v_x = \hat{x} \cdot (\bar{N}_{diff} - \bar{N}_{inc})$$
$$\lambda v_y = \hat{y} \cdot (\bar{N}_{diff} - \bar{N}_{inc})$$

The grating vector $\bar{v}$ is related to the grating's period Λ according to $$\Lambda = |v|^{-1}, |v| = \sqrt{v_x^2 + v_y^2}$$

The grating vector direction with respect to the SRDOE's coordinate x constitutes the grating orientation δ according to:

$$\cos(\delta) = \bar{v}\hat{y}$$

Figure 2H:
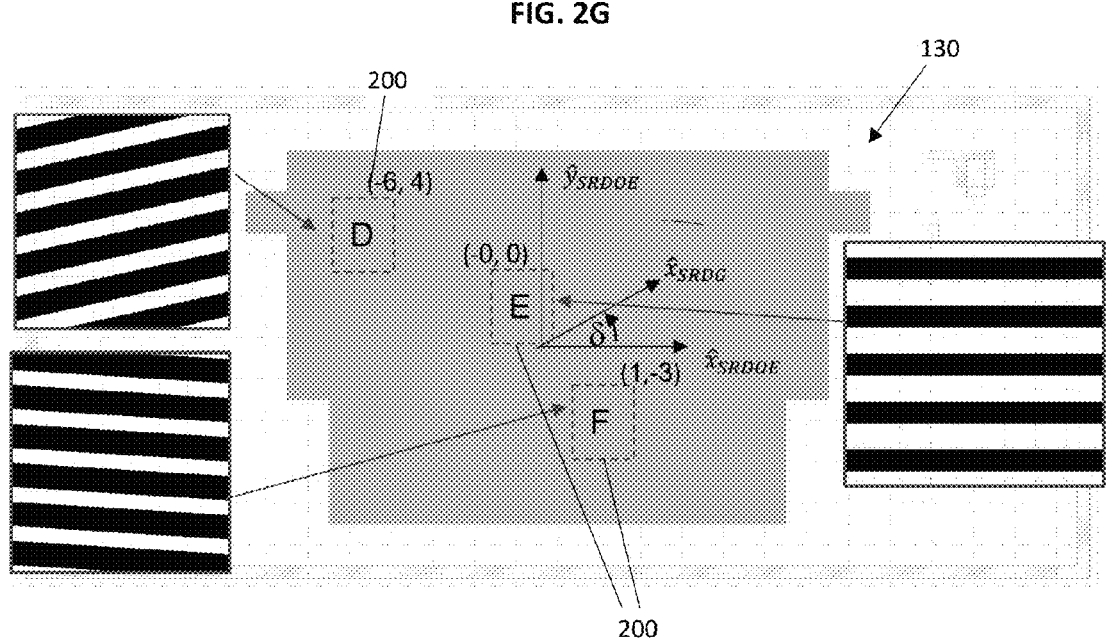
FIG. 2H shows a diagram of an exemplary SRDOE, serving as the first lens in off-axis 4f-system (i.e. associated with a projector) configured according to the principles of the present disclosure, exemplified as being designed for an illuminating wavelength of 637 nm and p-polarization.

Reference is made to FIGS. 2G and 2H which show diagrammatically two structures of exemplary SRDOEs 140 and 130, respectively, manufactured/designed (e.g., from titanium dioxide ($TiO_2$)) for second lens (combiner lens) and first lens (projector lens) of the off-axis 4f-system according to the principles of the present disclosure, and designed in these examples for illuminating wavelengths 450 nm and 637 nm, respectively. The figures show the exemplary configurations (patterns) of the selected unit cells 200— three such unit cells A, B and C (SRDGs) for the SRDOE 140, and three unit cells D, E and F (SRDGs) for the SRDOE 130, located at different regions/points of the respective SRDOEs.

Tables 1 and 2 present data in relation to unit cells A to C and D to F of the SRDOEs 140 and 130, respectively. More specifically, this data includes the various structural parameters of exemplary unit cells (SRDGs) obtained from RCWA calculation after optimization. Typical sizes of the SRDOE 140, 130 and the unit cell (each of the cells A to F) may be about 10×10 mm and 5×5 μm, respectively.

The center of the global coordinate system ($\hat{x}_{SRDOE}$, $\hat{y}_{SRDOE}$) of SRDOE 140, 130 is defined in the center of the element, and the coordinates ($\hat{x}_{SRDOE}, \hat{y}_{SRDOE}$) corresponding to respective centers of the unit cells are indicated in the figure in units of mm as follows: unit cell A—(0,1) mm, unit cell B—(−5, −4) mm, and unit cell C—(−5.6,2) in FIG. 2G; and unit cell D—(−6,4) mm, unit cell E—(−0, 0) mm, and unit cell F—(1,−3). Also indicated in the figure is the grating orientation (angle) δ of the ($\hat{x}_{SRDG}, \hat{y}_{SRDG}$) coordinate system of each unit cell defined as the counterclockwise angle between the global axis $\hat{x}_{SRDOE}$ and the respective local axis $\hat{x}_{SRDG}$ of the respective unit cell. Thus, the figure shows that the unit cells are differently oriented with respect to the global ($\hat{x}_{SRDG}, \hat{y}_{SRDG}$) coordinate system.

Table 1 and Table 2 indicate that each one of the unit cells A, B, and C has a different direction of the grating lines (grating vector $\vec{v}$) in the SRDOE 140 defined by the different value of orientation angle δ; and similarly each one of the unit cells D, E, and F has a different direction of the grating lines (grating vector $\vec{v}$) in the SRDOE 130. The variation of grating lines' direction (i.e. of the grating vector $\vec{v}$) of the unit cells (i.e., SRDGs) across the SRDOE affects the azimuthal angle $\phi_{diff}$ of the diffracted light beam and is critical for the proper functioning of the element as a lens.

It should be noted that since the location of each SRDOE within the 4f-system 120 is fixed, the ranges of polar and azimuthal incidence angles, $\theta_{inc}$ and $\phi_{inc}$, on each (center of) unit cell is known, so that this information is used in the optimization of the structural parameters of the SRDOE.

It should be understood that each SRDOE includes a high number of unit cells (SRDGs), e.g. approximately millions unit cells, while in the example presented here only 3 unit cells are considered located at different regions of the SRDOE.

In addition to angle δ, each unit cell (e.g., A, B, and C of SRDOE 140 of FIG. 2G and D, E and F of SRDOE 130 of FIG. 2H) is characterized by a different grating period Λ and a different etching depth h, as is also exemplified in Tables 1 and 2.

In Tables 1 and 2, $\lambda_0$ is the wavelength for which the exemplary SRDOE 140 (and thus the selected unit cells (SRDGs)), is designed for, e.g. 450 nm and 637 nm, respectively (as indicated above); and 2 is the wavelength of incident illumination used in the simulations.

It should be noted that the grating orientation of the unit cell, as well as ray polar and/or ray azimuthal angles may or may not be same, and can be entirely different in different locations of the SRDOE.

As stated above, the SRDOE of the present disclosure is wavelength and polarization sensitive element. The SRDOEs 140 and 130 of FIGS. 2G and 2H are designed for p-polarization, which is denoted by the electrical field complex amplitude in the $\hat{p}$ direction in Tables 1 and 2 indicating the complex amplitude of the electric field of the incident beam in the $\hat{p}$, $\hat{s}$ directions representing the polarization of the incident wave. As can be seen in Tables 1 and 2, nearly pure p-polarization can be obtained in the center of the SDROE, e.g., for unit cell A, E. However, if p-polarized beam is incident on the SRDOE, the effective incident polarization on unit cells farther from the center, e.g., unit cells B and C as well as unit cells D and F, will be some mixture of p- and s-polarizations, as indicated in Tables 1 and 2. This mixed polarization is considered when designing the specific surface relief of the specific unit cells.

As already mentioned above, the configuration of the SRDOE of the present disclosure provides that most of the intensity of the diffracted incident beam is converted into a single diffraction order, typically the first diffraction order. The SRDOE of the present disclosure may as well be configured to diffract most of the incident light field intensity into the zeroth diffraction order, as described above. The diffraction efficiency is defined as:

$$\eta_{diff}^{1st} = \frac{P_{diff}^{1st}}{P_{inc}}$$

where $P_{diff}^{1st}$ is the light power diffracted into the first diffraction order, $P_{in}$, is the power of the incident light ray, and $\eta_{diff}^{1st}$ is the diffraction efficiency of the first diffraction order.

The SRDOEs according to the principles of the present disclosure can be configured to diffract the incident light ray 210 to a wide range of angles, $\theta_{diff}$, $\phi_{diff}$ of the diffracted ray $\overline{N}_{diff}$ 220.

As mentioned above, the inventors have shown that "Out of Bragg" diffraction efficiency (i.e. diffraction not satisfying Eq. (1) above) can remain relatively high (up to 90% and higher) by properly selecting such pattern parameter as the fill factor, and have also shown that a proper selection of grating vector can maintain Bragg condition for large azimuthal diffraction angles.

TABLE 1

| SRDG | λ, nm | $\lambda_0$, nm | Line width nm | Etching depth, nm | Period nm | δ deg | $\theta_{inc}$ deg | $\phi_{inc}$ deg | S_amp | P_amp |
|---|---|---|---|---|---|---|---|---|---|---|
| A | 450 | 450 | 176 | 729 | 324 | 0 | 44.9 | 0 | 0 | −0.32+0.94j |
| B | | | 172 | 729 | 294 | 10 | 47 | 10 | −0.015+0.45j | −0.015+0.45j |
| C | | | 180 | 729 | 330 | 18 | 46 | 18 | −0.47+0.58j | −0.45−0.47j |

TABLE 2

| SRDG | λ, nm | $\lambda_0$, nm | Line width nm | Etching depth, nm | Period nm | δ deg | $\theta_{inc}$ deg | $\phi_{inc}$ deg | S_amp | P_amp |
|---|---|---|---|---|---|---|---|---|---|---|
| D | 637 | 637 | 177 | 552 | 416 | 13 | 56 | 9 | 0.56+0j | −0.83+0j |
| E | | | 181 | 552 | 450 | 0 | 45 | 0 | 0+0j | −1+0j |
| F | | | 186 | 552 | 483 | −2.7 | 36 | −4.3 | −0.16+0j | −0.9859+0j |

In this connection, reference is made to FIGS. 3A to 3D which present results of numerical calculation, conducted by the inventors using RCWA, of the first order diffraction efficiency $\eta_{diff}^{1st}$, i.e., the efficiency of converting, by the SRDOE, the incident ray $\overline{N}_{inc}$ 210 into a first order diffracted ray $\overline{N}_{diff}^{1st}$ 220.

Rigorous coupled-wave analysis (RCWA) is a rigorous method for analyzing diffraction efficiencies in periodic structures. The calculation parameters are for wavelength λ=632 nm, β=90°, ϕ=0°, α=0° with different values of period, Λ, and fill factor, $$\frac{D}{\Lambda}.$$

Figure 3A:
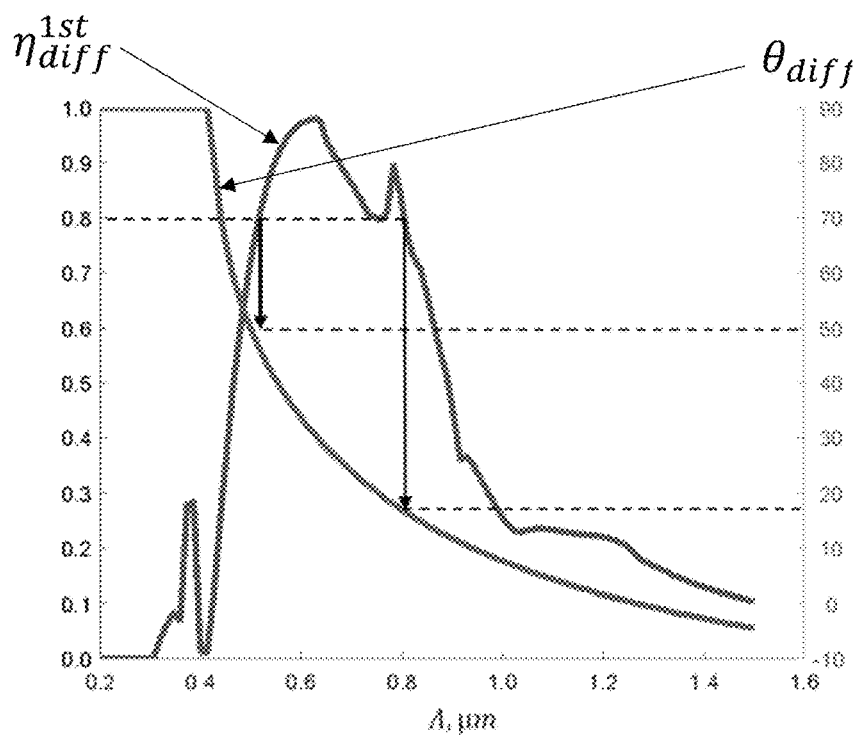

FIG. 3A shows the diffraction efficiency $\eta_{diff}^{1st}$ and the polar diffraction angle $\theta_{diff}$ as a function of grating period Λ using a fixed fill factor of $$\frac{D}{\Lambda} = 0.5.$$

The results indicate that diffraction efficiency higher than 80% can be obtained over a range of about 30 degrees of the polar diffraction angle $\theta_{diff}$ (from about 20 deg to about 50 deg).

Figure 3B:
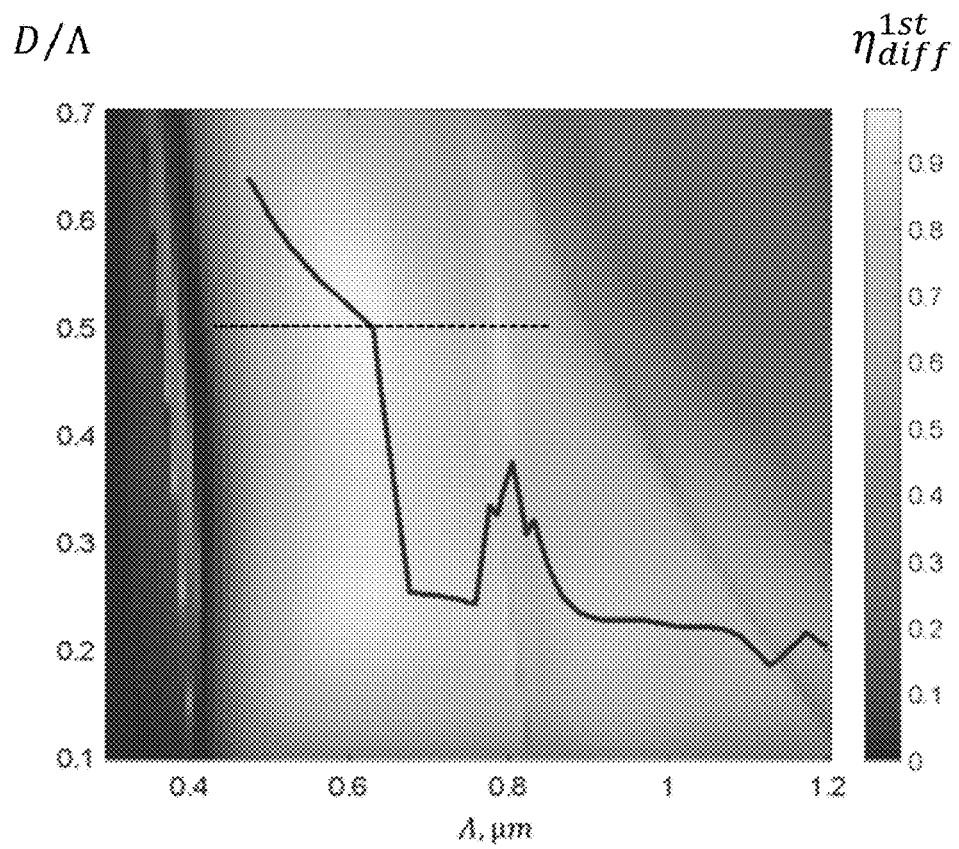

The black solid curve in FIG. 3B shows the optimal (i.e., maximum efficiency in the first order diffraction) fill factors $$\frac{D}{\Lambda}$$

for different grating periods Λ. In the same figure, the distribution of the diffraction efficiency of the first order, $\eta_{diff}^{1st}$ is shown for the full range of calculated grating periods and fill factors (i.e., a 2D map of the diffraction efficiency as function of the grating period and fill factor). The dashed curve in FIG. 3B indicates the constant fill factor $$\left(\frac{D}{\Lambda} = 0.5\right)$$

chosen for the calculations shown in FIG. 3A.

Figure 3C:
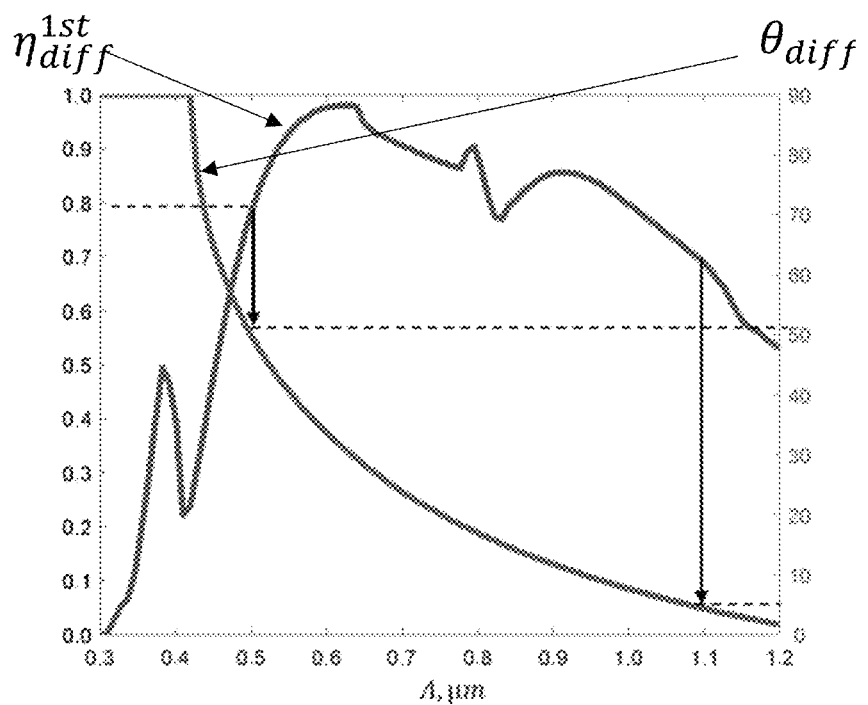

FIG. 3C shows the diffraction efficiency $\eta_{diff}^{1st}$ and the polar diffraction angle $\theta_{diff}$ as a function of grating period Λ, using a variable fill factor, i.e., using a different fill factor for each grating period.

The results show that a proper selection (according to the values on the black solid line in FIG. 3B) of the fill factor provides efficient energy conversion of $\overline{N}_{inc}$ to $\overline{N}_{diff}$ over a wide range of the polar diffraction angle $\theta_{diff}$, e.g., between 5° to 70°, with diffraction efficiency being higher than 50%. This angular range of the polar diffraction angle $\theta_{diff}$ is significantly higher than the respective angular range obtained when using a constant fill factor, as shown in FIG. 3A.

Figure 3D:
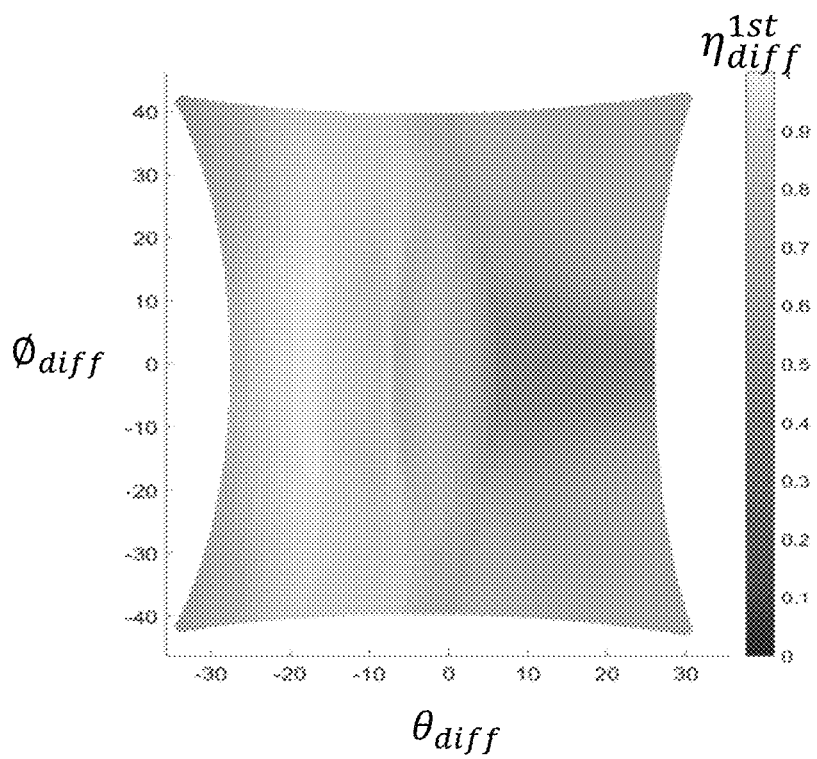

FIG. 3D shows the calculated diffraction efficiency $\eta_{diff}^{1st}$ for the azimuthal angular range Δϕ=80° ranging from $\phi_{diff}$=−40° to $\phi_{diff}$=40° and polar angular range Δθ=60° ranging from $\theta_{diff}$=−30° to $\theta_{diff}$=30°. It can be deduced from this data that an average diffraction efficiency $\eta_{diff}^{1st}$ of about 80% can be obtained in these wide angular (azimuthal and polar) ranges. These wide ranges of $\theta_{diff}$ and $\phi_{diff}$ are obtained for the same wavelength λ=632 nm, while at each incidence angle, $\theta_{inc}$, Bragg condition is almost/substantially satisfied by varying the local period Λ, and the high efficiency is obtained by adjusting the local fill factor.

As described above, the SRDOE of the present disclosure is a wavelength and polarization selective element and may be configured for each of at least one selected wavelength and selected polarization state. When the SRDOE is illuminated with its designated wavelength and polarization, it diffracts most of the energy into the first diffraction order. Alternatively, when the SRDOE is illuminated with wavelengths and/or polarizations other than the designated one, most of the light field intensity is transmitted through the zeroth diffraction order. Each SRDOE of the present disclosure is formed by the arrangement of SRDGs as described above, and each SRDG may be configured to diffract the incident light field into one of two dominant diffraction orders with high efficiency at certain discrete selective wavelength(s) only.

Reference is made to FIGS. 4A to 4C and FIGS. 5A to 5C which demonstrate wavelength and polarization selectivity of the SRDOE.

Figure 4A:
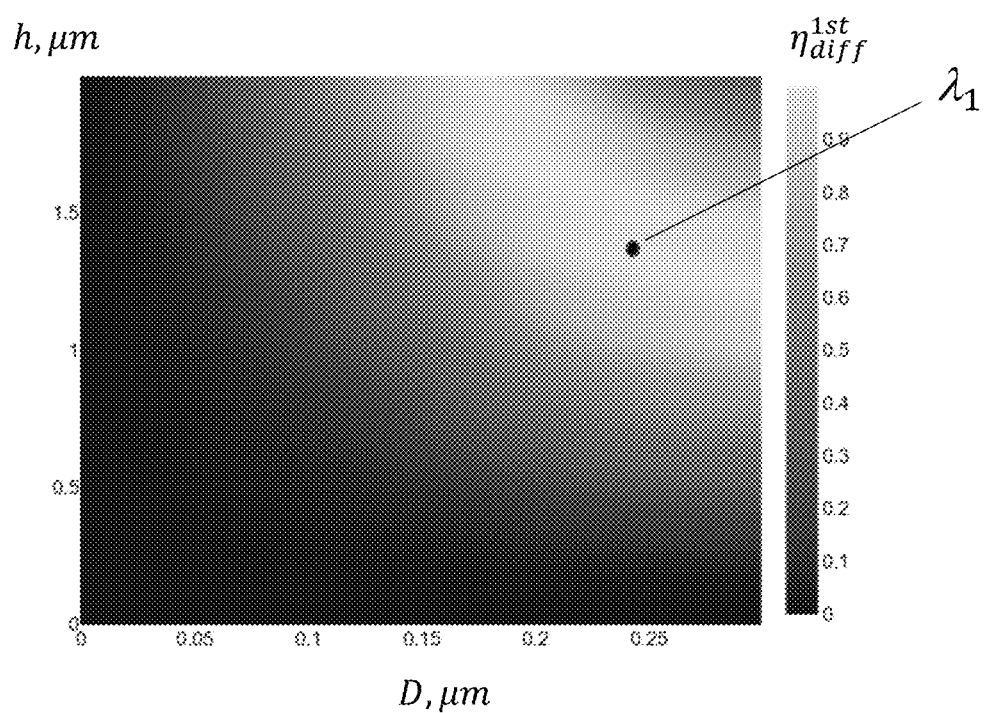
FIGS. 4A to 4C show, respectively, RCWA numerical calculations of first order diffraction efficiency of SRDG for three wavelengths: 632 nm (FIG. 4A), 520 nm (FIG. 4B), and 450 nm (FIG. 4C) demonstrating orthogonality in polarization and wavelengths of the incident beam.
Figures 4B, 4C:
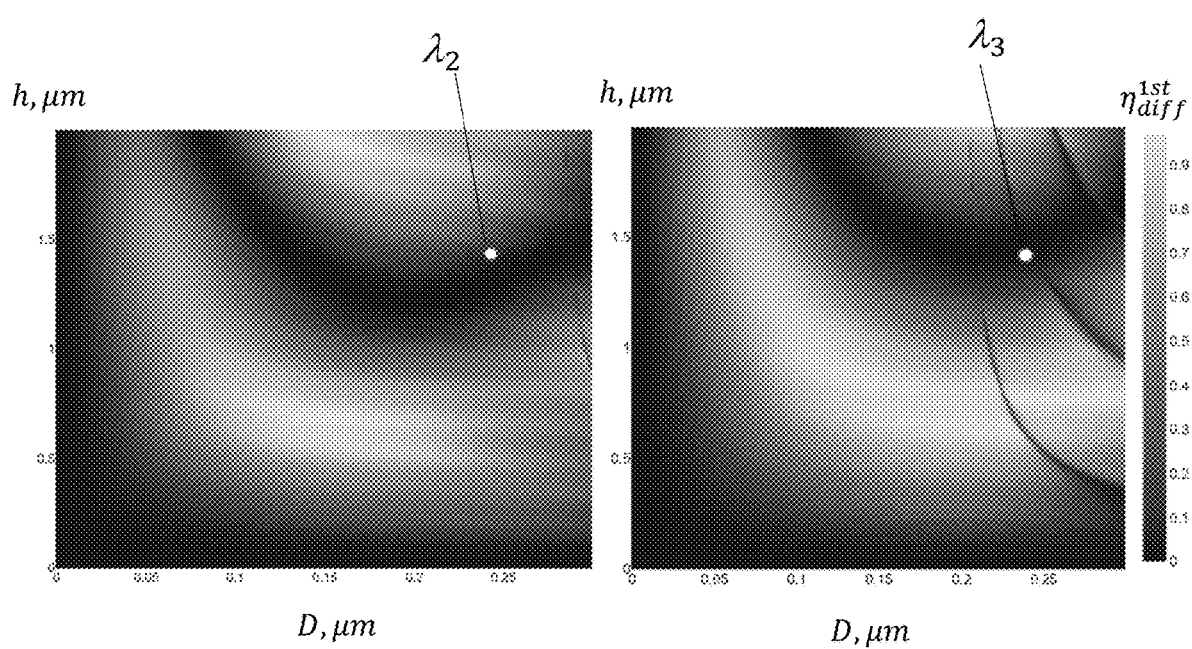
Figure 5A:
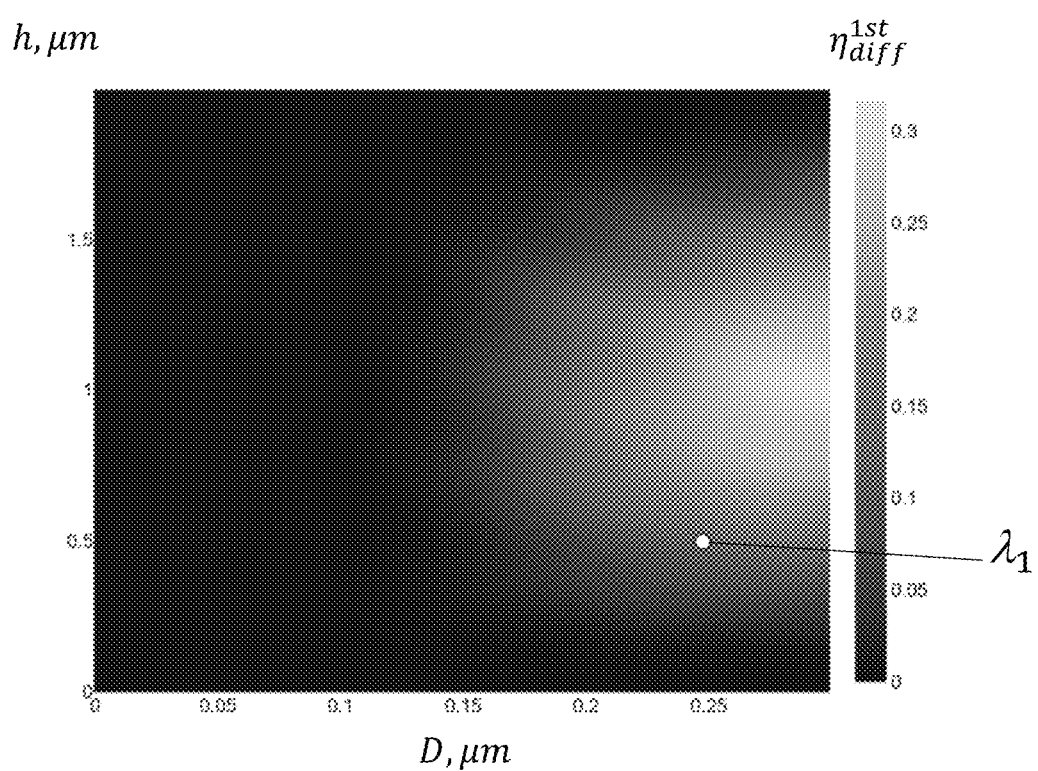

FIGS. 4A to 4C show the first order diffraction efficiencies $\eta_{diff}^{1st}$ of the SRDOE having the following parameters of the central SRDG (unit cell): Λ=0.632 μm, D=0.25 μm, h=1.4 μm, α=0° and incident beam parameters of θ=30°, ϕ=0°, for three different wavelengths, 632 nm (FIG. 4A), 520 nm (FIG. 4B) and 450 nm (FIG. 4C). The respective diffraction efficiencies $\eta_{diff}^{1st}$ obtained are:

$\eta_{diff}^{1st}(\lambda 1=632\text{ nm},\beta=0°)=0.98$ $\eta_{diff}^{1st}(\lambda 2,3=520,450\text{ nm},\beta=90°)\sim 0.03$ FIGS. 5A to 5C show, respectively, similar calculations to those shown in FIGS. 4A to 4C, where the gratings' period Λ is changed to 0.43 μm and where the same three different wavelengths, 632 nm (FIG. 5A), 520 nm (FIG. 5B) and 450 nm (FIG. 5C) are used in calculations. FIGS. 5A to 5C demonstrate that when the grating's parameters, specifically the period Λ and the height h, are selected to be Λ=0.43 μm, and h=0.5 μm (the response (i.e., first order diffraction efficiency $\eta_{diff}^{1st}$) changes to $\eta_{diff}^{1st}(\lambda 1=632\text{ nm},\beta=0°)=0.06$ $\eta_{diff}^{1st}(\lambda 2=520,\beta=90°)\sim 0.55$ $\eta_{diff}^{1st}(\lambda 3=450,\beta=90°)\sim 0.65$ Therefore, in some embodiments, the lens of the present disclosure may be formed from a stack of two or more adjacent SRDOEs configured for two or more different wavelengths. For example, in a stack of two adjacent SRDOEs, the first SRDOE may be configured with grating parameters described above with reference to FIGS. 4A to 4C and the second SRDOE may be configured with grating parameters described above with reference to FIGS. 5A to 5C. When this stack of two SRDOEs is illuminated with the light field including light components of wavelengths of red (λ=632 nm), green (λ=520 nm), and blue (λ=450 nm) spectra (RGB), the first SRDOE will diffract in the first diffraction order only the red beam and transmit the blue and green beams through the zeroth order, while the second SRDOE will diffract in the first diffraction order the blue and green beams only and transmit the red beam through the zeroth order without affecting its direction of propagation.

The SRDOE configured according to the present disclosure, e.g., as described in FIGS. 2A to 2G, as well as a stack of such SRDOEs configured for wavelengths of different spectra as described above, may form a building block of the Lens 1 and/or Lens 2 of the off-axis 4f-system(s) based relay used in the near-eye mixed reality system, as will be described in detail further below.

The local (i.e., in ($\hat{x}_{SRDG}, \hat{y}_{SRDG}$) coordinates) spatial frequency vector $\bar{v}$ of the SRDG (unit cell) is:

$$\bar{v}(x, y) = \frac{1}{2\pi} \nabla_\perp \varphi(x, y)$$

where $\nabla_\perp \varphi(x, y)$ is the gradient of the locally varying phase function $\varphi(x, y)$ of the SRDG.

The grooves defined by the surface relief pattern of the SRDG constitute groove lines according to $$\varphi(x,y) = 2\pi \cdot n$$

From the desired imposed phase on the first diffraction order, the grating vector can be calculated which in turn dictates grating orientation and period for the entire arrangement of unit cells (SRDGs) of the SRDOE.

As described and shown above, the lens formed by at least one SRDOE of the present disclosure is designed for at least one selected wavelength and specific polarization. As also described above, the lens may be formed by a stack of SRDOEs (e.g. implemented as a stack of layers), each SDROE configured for designated wavelength and polarization. When the SRDOE is illuminated with its designated wavelength and polarization, it diffracts most of the energy into the first diffraction order. Alternatively, when the SRDOE is illuminated with wavelengths and/or polarizations other than the designated one, most of the light field intensity is transmitted through the zeroth diffraction order.

The $k^{th}$ diffraction order efficiency of the $i^{th}$ SRDOE is denoted as $\eta_i^k(\lambda_i)$, where $\lambda_j$ is the illuminating wavelength. Accordingly, in an ideal SRDOE-based lens, $$\eta_i^1(\lambda_j) = \begin{cases} 1, i = j \\ 0, i \neq j \end{cases},$$

and $$\eta_i^0(\lambda_j) = \begin{cases} 0, i = j \\ 1, i \neq j \end{cases}$$

Each SRDOE can impose any phase functions of the designated incident wavelength [7.8].

Figure 6A:
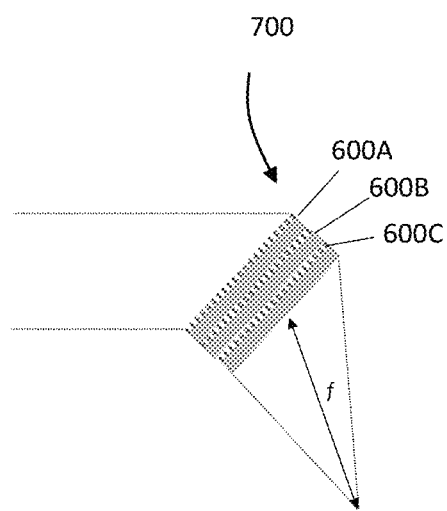
FIGS. 6A and 6B show, respectively, two examples of stack-type configuration of the SRDOE-based lens with no slant (FIG. 6A) and slanted (FIG. 6B) surface relief patterns.
Figure 6B:
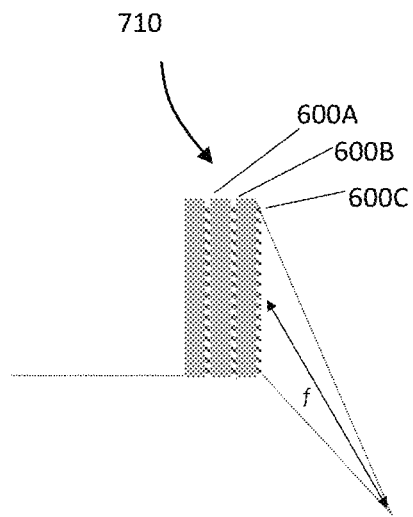

Reference is made to FIGS. 6A and 6B which describe, respectively, two optical configurations of SRDOE-based converging lenses 700 and 710, where each of these lenses 700 and 710 is formed of three stacked SRDOEs 600A, 600B and 600C. Each SRDOE within the stack is configured as described above. e.g., has the global surface relief pattern with varying one or more pattern parameters and being formed by a continuous two-dimensional arrangement of unit cells (SRDGs) having a local surface relief pattern with constant value(s) of said one or more pattern parameters. Each SRDG is characterized by the following local parameters: period, line width, etching depth, slant angle $\alpha$, and side wall angle $\gamma$.

In these examples, the stacked SRDOEs of lens 700 in FIG. 6A is configured with binary SRDGs, whereas the stacked SRDOEs of lens 710 of FIG. 6B are formed from slanted SRDGs.

In the following, two examples of lens without slant angle in the SRDGs patterns, i.e., $\alpha=0°$ (lens 700 of FIG. 6A), including three SRDOE layers 600A, 600B and 600C, are described in detail. The lenses are designed for wavelengths 637 nm (R), 520 nm (G), and 450 nm (B), with polarization angles of $\beta_R=90°$, $\beta_G=0°$, and $\beta_B=90°$, respectively and are illuminated with respective polar and azimuthal angles $\theta=45°$, $\phi=0°$. The diffraction efficiencies $\eta_{ij}^1$, $\eta_{ij}^0$ are calculated using rigorous coupled-mode analysis.

Tables 3 and 4 below show numerically calculated $\eta_{ij}^1$ and $\eta_{ij}^0$ for a lens made from, respectively, fused silica (FS) with $n_0=n_1$, $n_2 \sim 1.457$, and Si3N4 with $n_0=n_1$, $n_2 \sim 2.06$. The results in both tables demonstrate that with proper selection of such pattern parameters as grating line width D and etch depth h, each SRDOE layer can provide wavelength selectivity and achieve $\eta_{ij}^1$, $\eta_{ij}^0$ close to an ideal (~100%).

TABLE 3

| | | $\eta^1$ | | | $\eta^0$ | | | | |
|---|---|---|---|---|---|---|---|---|---|
| j = λ, nm | 637 | 520 | 450 | 637 | 520 | 450 | Etch | Line | |
| β | 90° | 0° | 90° | 90° | 0° | 90° | depth, nm | width, nm | Period, nm |
| Element 637 | 0.95 | 0.00 | 0.03 | 0.04 | 0.93 | 0.84 | 1250 | 100 | 450 |
| (i) 520 | 0.00 | 0.91 | 0.00 | 0.84 | 0.00 | 0.99 | 1590 | 227 | 370 |
| 450 | 0.00 | 0.03 | 0.99 | 0.93 | 0.95 | 0.02 | 733 | 164 | 320 |

TABLE 4

| | | $\eta^1$ | | | $\eta^0$ | | | | |
|---|---|---|---|---|---|---|---|---|---|
| j = λ, nm | 637 | 520 | 450 | 637 | 520 | 450 | Etch | Line | |
| β | 90° | 0° | 90° | 90° | 0° | 90° | depth, nm | width, nm | Period, nm |
| Element 637 | 0.95 | 0.16 | 0.02 | 0.04 | 0.85 | 0.94 | 1157 | 140 | 450 |
| (i) 520 | 0.00 | 0.99 | 0.03 | 0.96 | 0.00 | 0.95 | 628 | 146 | 370 |
| 450 | 0.00 | 0.04 | 0.95 | 0.84 | 0.94 | 0.02 | 277 | 100 | 320 |

Thus, the above describes lenses formed from SRDOEs, serve as building blocks in 4f-system based relay configuration for use in a near-eye mixed reality system provided by the present disclosure. The optical systems described below exemplify implementation of off-axis 4f systems in which at least one of the two lenses is formed of at least one resonance domain SRDOE configured as described above.

In some embodiments, the SRDOEs are designed and produced to function as an f-theta lens [6], i.e., SRDOE whose lensing effect provides for focusing a laser beam onto a planar image plane, which facilitates its use in a scanning system. The off-axis 4f system can include two such f-theta lenses and operate as a relay system. As described above, such 4f system based relay system operates to relay relevant light information (virtual light field) from the light engine onto the eye pupil plane (eyebox). The systems exemplified below vary in the number of wavelengths they support, form factor, and number of SRDOEs. The systems are designed using raytracing and RCWA methods. An optimizer is provided with a cost function, and the grating parameters are selected to minimize the cost function. Once the raytracing has reached an acceptable cost, the RCWA is optimized to find the best efficiency, transparency and wavelength and polarization orthogonality (i.e., wavelength and polarization selectivity).

Figure 7A:
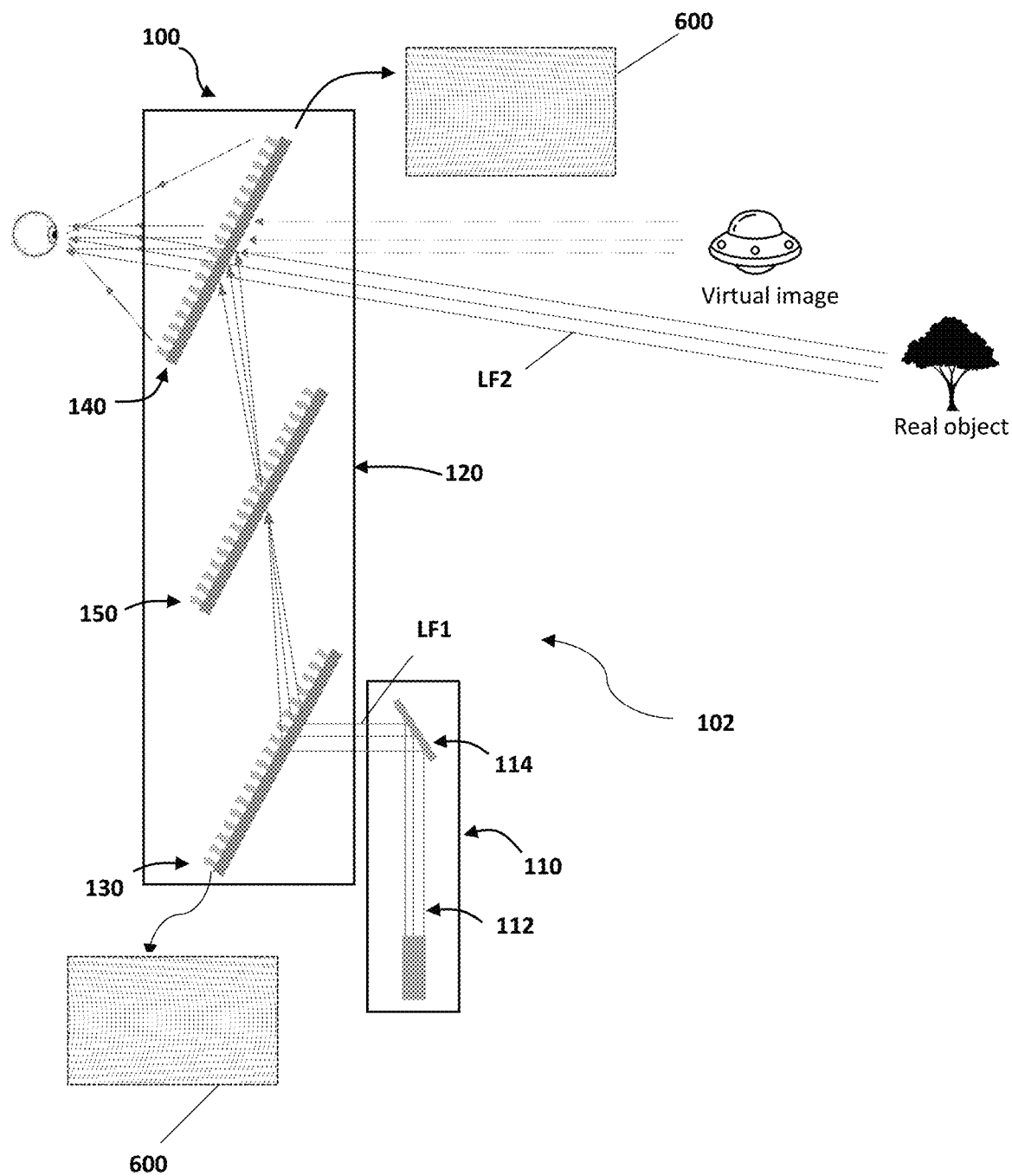
FIGS. 7A and 7B show two embodiments, respectively, of free space relay systems according to the present disclosure, where each relay system includes an off-axis 4f-system with two SRDOEs and a third element placed at the intermediate plane of the relay, wherein FIG. 7A exemplifies a monochrome relay system including two SRDOEs configured as converging lenses and one element for aberration correction and beam expanding.

FIG. 7A illustrates schematically a near-eye mixed reality system 102 which includes the optical system 100 which is configured as/includes a relay system. The system 102 is configured generally similar to the system of FIG. 1, and in this specific not limiting example is configured as a monochrome (i.e., designed for a single discrete wavelength). The relay system 100 includes an off-axis 4f-system 120 and is associated (receives input light field from) a light engine 110. The virtual light field LF1 generated by the light engine 110 generally includes light of a single spectral range (single color). The 4f-system 120 includes two lenses 130 and 140 and may also include a beam expander 150 located in the intermediate Fourier plane.

The first lens 130 may or may not include any SRDOE, and if it does this a single SRDOE 600. The first lens 130 is preferably configured to utilize the principles off-theta lens, and also operates as a folding element for bending light propagation path of light beam interacting therewith. This lens 130 relays the virtual light filed LF1 from the light engine 110 towards the second lens 140. The second lens is formed of the single SRDOE 600. In case both lenses 130 and 140 include SRDOEs, the surface relief patterns of these SRDOEs are different from one another.

The second lens (it's SRDOE) 140 is configured as a f-theta lens, and as a folding element (for bending light propagation path of light beam interacting therewith) and is also configured as a combiner for combining the virtual light field LF1 and the real-world light field LF2 as will be described further below. It should be understood that the lens 140 is configured as an f-theta lens, folding element, and is characterized by transparency in angles of incidence of light field LF2 from the real-world scenery.

The beam expander 150 accommodated in the intermediate image plane is configured to expand the light field interacting therewith and accordingly expands the eyebox, and is also configured to correct most dominant aberrations known for this type of system, such as field curvature and astigmatism known to occur in off-axis configurations. The beam expander has a light interacting surface configured as Metasurface or freeform surface, and/or diffractive or refractive element.

The SRDOE 600 of the second lens 140 is configured to divide intensity of the light field incident thereon into two dominant diffraction orders being the first diffraction order and the zeroth diffraction order. The zeroth diffraction order allows light field LF2 from the environment to pass through the lens 140 to the eye pupil, whereas the first diffraction order relays the light field LF1 coming from the first lens 130 to the pupil.

The SRDOEs 600 forming the lens 140 and also that forming the lens 130, as the case may be, is configured as a resonance-domain diffraction grating as described above having the predetermined global surface relief pattern with global variation of at least some of pattern parameters across said SRDOE. However, in case the first lens is also formed of the SRDOE, the patterns of the SRDOEs of lenses 130 and 140 are different from one another because these lenses have different functions, i.e. differently affect the propagation of light field(s) interacting therewith.

Since the SRDOE of the second lens 140 is to be, at the same time, transparent to light field LF2 from the environment being transmitted through its zeroth order and to relay (i.e., diffract) light field LF1 from the first lens 130, the SRDOE of the second lens 140 is configured with about 10%-50% diffraction efficiency (it should be understood that in some applications the efficiency is not as important as the transparency) for the designed discrete wavelength in the first (i.e., the first diffraction order) and the second (i.e., the zeroth diffraction order) dominant diffraction orders. It is to be noted that the fact that the SRDOE of the second lens 140, functioning as a combiner, transmits only about 50% of the intensity of the light field LF2 from the environment at the designed discrete wavelength does not affect the quality of the viewed external scene, since this lowered (to about 50%) transmission is effective only for a specific polarization of light and, typically, light from the environment is unpolarized.

Since the first lens 130 has no combiner functionality in the system, it may be formed of an SDROE or may generally be implemented with Metasurface, a freeform, or a mirror.

Figure 7B:
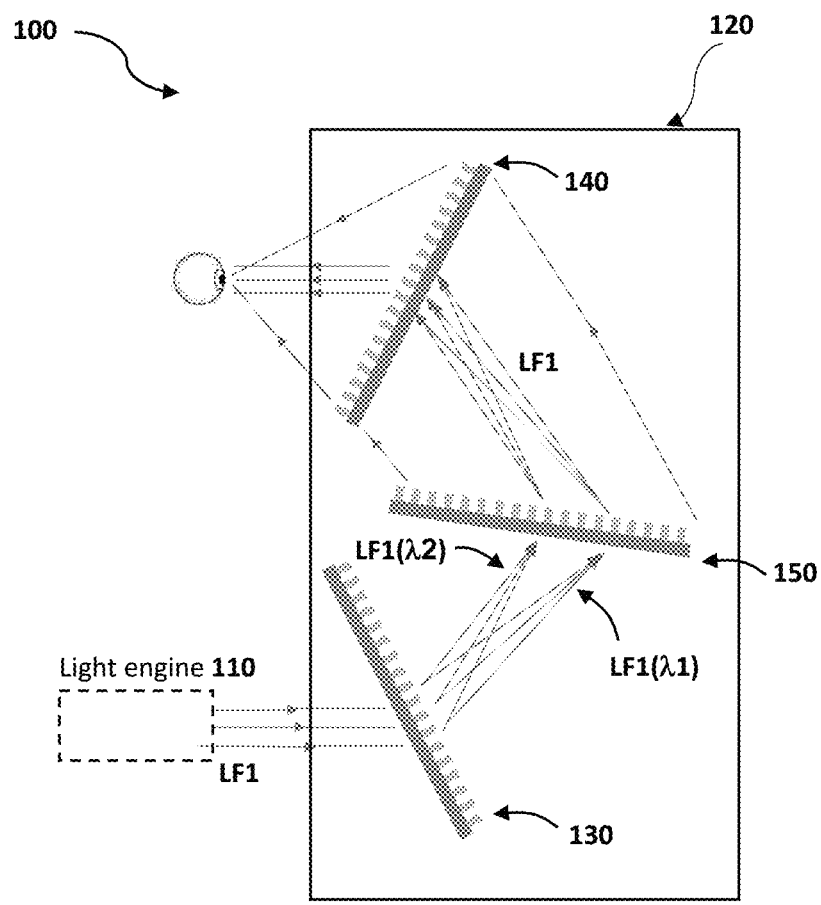

Reference is made to FIG. 7B showing another example of an optical system 100 according to the present disclosure, which is configured generally similar to the above-described examples but including a relay system formed by a two-color off-axis 4f-system with dispersion correction. The off-axis 4f-system 120 includes first and second lenses 130 and 140 formed of first and second SRDOEs (with different patterns) and a beam expander 150 in the Fourier plane.

Each of the lenses 130 and 140 is formed of a single SRDOE (not a stack of two or more SRDOEs) configured to diffract light into the first diffraction order at two discrete wavelengths λ1 and λ2 only while transmitting any other colors through the zeroth diffraction order. For example, the SRDOE diffracts blue and green light only into the first diffraction order, e.g., is similar to the SRDOE having configuration/parameters as described above with reference to FIGS. 5A to 5C. Whereas the SRDOE 130 on the projector side does not require transparency, the SRDOE 140 on the eye side does. In that case, the SRDOE 140 on eye side may sacrifice efficiency for the sake of transparency. The SRDOE 130 on the projector size is optimized for maximum efficiency with not transparency consideration.

The beam expander 150, placed in the intermediate image plane between lenses 130 and 140 is configured to expand the light field interacting therewith (and thus expand eyebox) and correct dispersion. Dispersion, as used here, is the change in light diffraction direction due to illumination at a wavelength different than the designed one. The wavelength components LF1(λ1) and LF1(λ2) of the virtual light field LF1 are diffracted by SRDOE of lens 130 and, due to dispersion, are focused separately (along spaced-apart propagation paths) on the beam expander 150. Therefore, the beam expander is configured with two different regions (patterned regions) dedicated to different wavelengths, respectively, to thereby correct dispersion by combining them to propagate along common propagation path.

Figure 8:
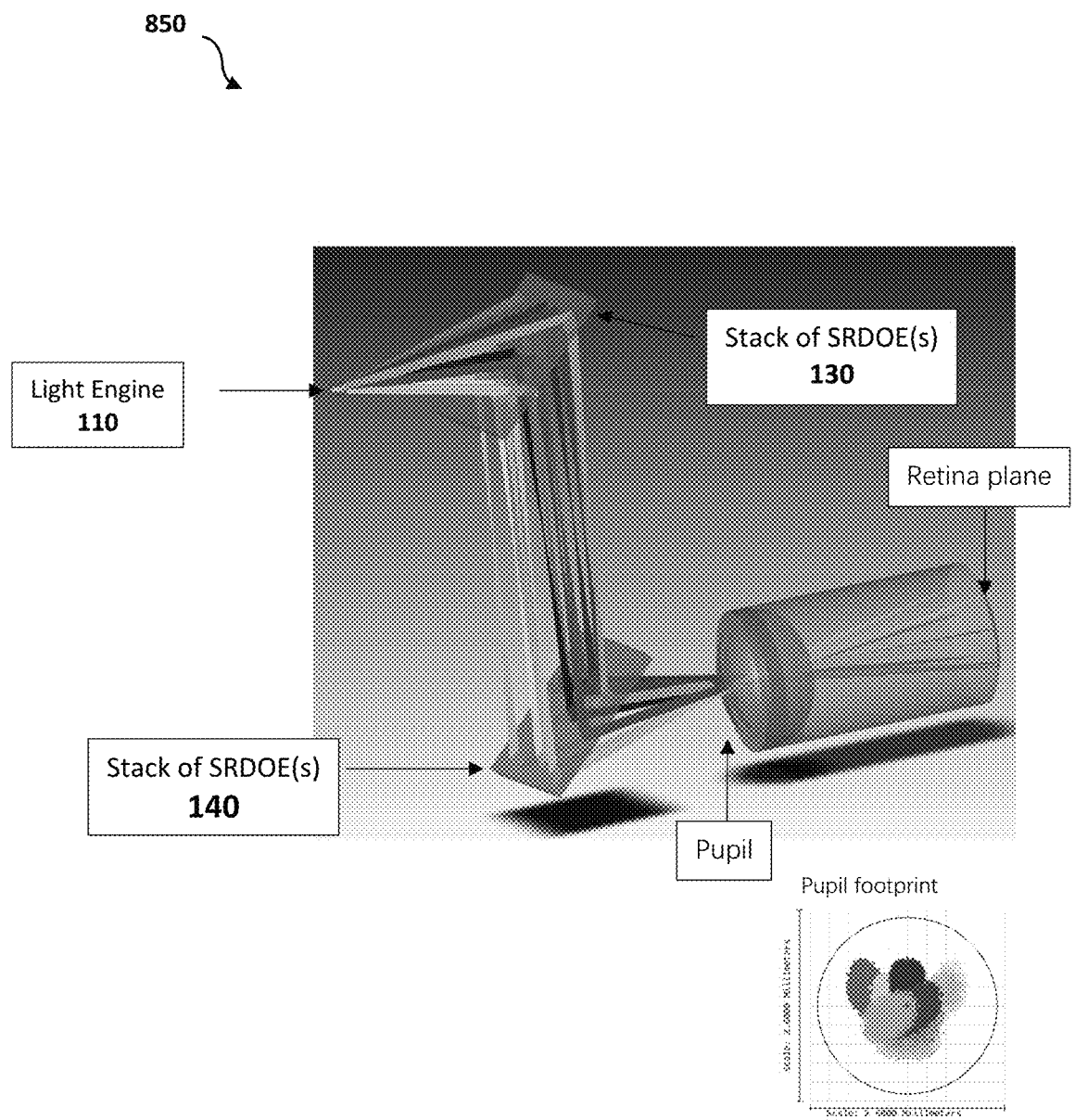
FIG. 8 shows a ZEMAX calculation of free space relay system according to the present disclosure including two SRDOE stacks as the first and second lenses of the off-axis 4f-system.

Reference is made to FIG. 8 showing a ZEMAX calculation of a relay system implemented as a free space off-axis 4f-system 850 including two lenses 130 and 140, where each of these two lenses is formed by a stack of three SRDOEs, each SRDOE being configured to diffract the light field incident thereon with high efficiency into the first diffraction order for one of red, green and blue wavelengths. The light propagation scheme is shown in the figure in a self-explanatory manner. This calculation provides the following results: FOV of 40×20 deg, the SRDOE diffraction angles ranges $\theta_{diff}$=35–57 deg, $\phi_{diff}$=−20-20 deg, and eyebox size of 1.5 mm.

The relay system 850 is transparent to wavelengths other than the designed wavelength, i.e., these other wavelengths are transmitted (with nearly 100% efficiency) through the zeroth diffraction order. Each one of the lenses 130 and 140 implements a computer-generated (calculated desired phase) for the selected operative wavelength, where the phase was calculated through optimization using ray tracing. The lenses impose that phase through diffraction in the first order.

In the following, several additional examples of the relay system of the present disclosure are exemplified which are configured for use in augmented reality (AR) head mounted displays (HMD) and augmented reality glasses. To facilitate understanding, in all the examples, functionally similar elements/parts of the system are identified by the same reference numbers.

Thus, each of the optical systems described below is configured as a relay system 100 which includes at least one off-axis 4f-system 120 where one or both of the lenses is/are formed of at least one SRDOE configured as described above. The off-axis 4f-system 120 is associated with (is exposed to) a virtual light field LF1 from a light (laser) engine 110. The relay system 120 is configured (i) to relay the virtual image light field LF1 from the light engine 110 onto the eyebox 170 in the proximity to the eye pupil plane and (ii) to combine the virtual image LF1 with the real-world light field (not shown).

The light engine 110 typically includes a light source unit 112 configured to produce red (R), green (G), and blue (B) light components combined to a single collimated beam LF1, and a scanning mirror 114. The size of the output aperture of the light engine, e.g., size of scanning mirror 114, defines the entrance pupil size of the relay system 100.

The size of the eyebox 170 is defined by the beam width emerging from the light engine 110 (i.e. defined by the scanner 114) can be increased by using an expander 150 in the intermediate Fourier plane of the 4f-system. In all these examples, the SRDOE-based lens 140, and possibly also lens 130, is formed by stacked SRDOEs. These SRDOEs feature polarization, wavelength, and angular selectivity. They can be designed for diffraction of the RGB wavelengths, and are entirely transparent for all other wavelengths.

Figure 9A:
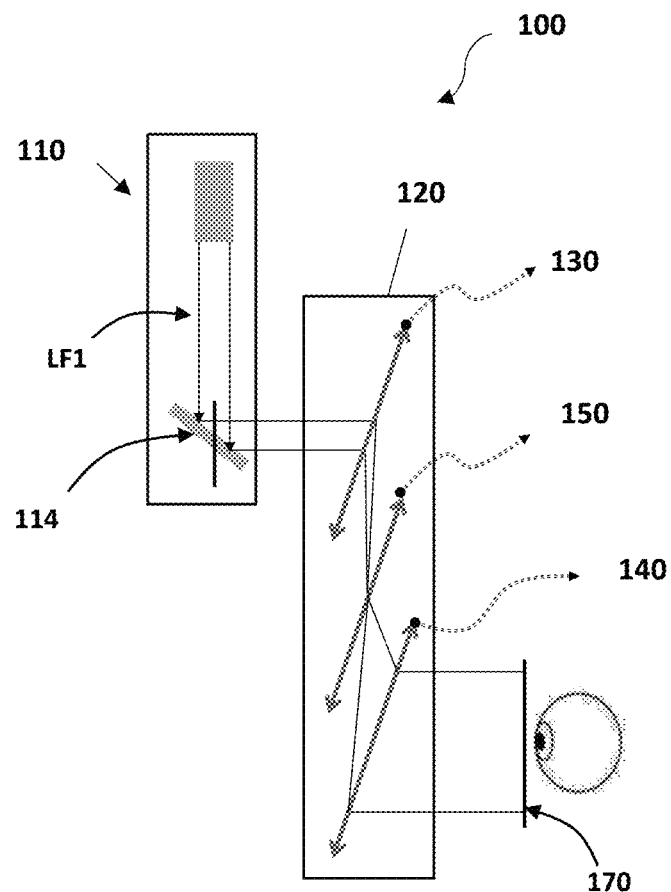
FIGS. 9A to 9C show three more examples of the relay system of the present disclosure, wherein FIG. 9A present the exemplary system schematically by a block diagram.

FIG. 9A shows an exemplary optical system 100 configured as a relay system including an off-axis 4f-system 120. In this example, both lenses 130 and 140 of the 4f-system 120 are formed of stacks of SRDOEs which are implemented with parallel configuration. The lenses 130 and 140 are configured as converging lenses. Second lens 140 of the relay functions also as a combiner for virtual and real world light fields as described above. In this example, an optical element 150 located in the intermediate image plane (Fourier plane) between lenses 130 and 140 is configured as a beam expander 150 to enable a larger eyebox 170. As described above, such beam expander 150 may be configured as any one of: Metasurface, diffractive or refractive element.

Figure 9B:
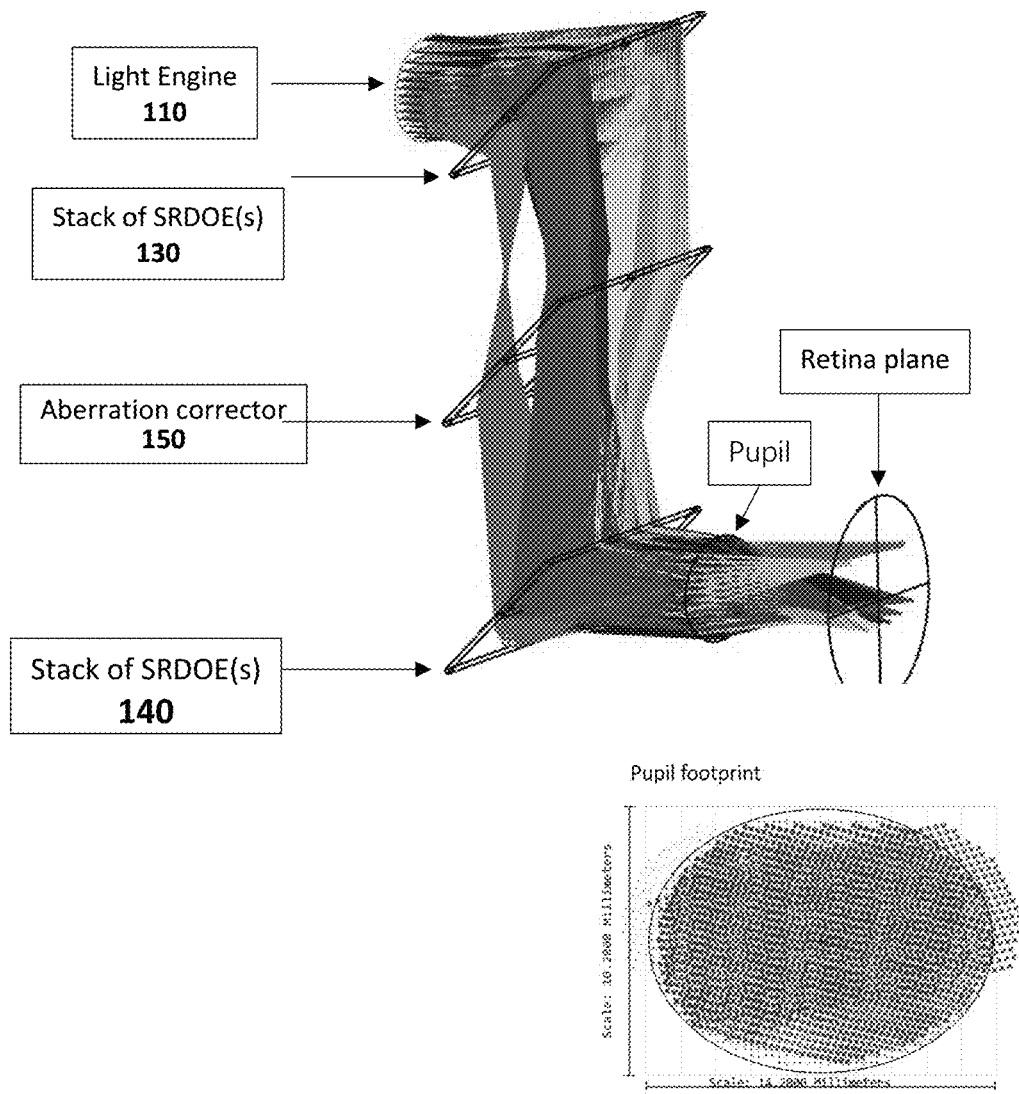
Figure 9C:
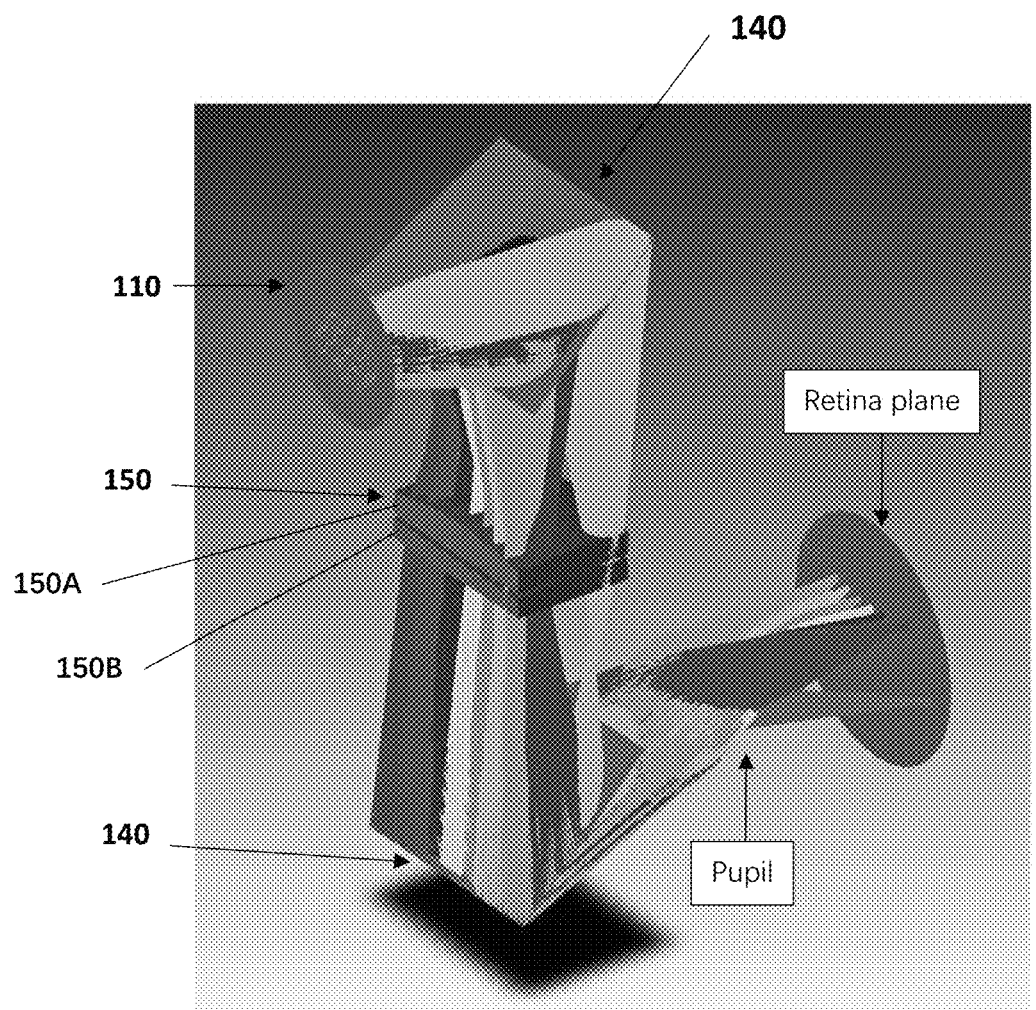

FIGS. 9B and 9C show ZEMAX calculations of two relay systems, each configured according to the present disclosure, i.e., including of-axis 4f-system in which two lenses 130 and 140 are formed of stacks of SRDOEs configured as described above. In both of these examples, the relay system also includes an on-axis optical unit 150 at the intermediate image plane. This optical unit 150 is configured as an aberration corrector (and may not be an expander).

In the example of FIG. 9B the unit 150 is a single-element unit formed with a certain surface relief (pattern), and may for example be configured as an SRDOE, or volume hologram unit, or meta-lens. In the example of FIG. 9C, the optical unit 150 includes two elements 150A and 150B being, respectively, a cylindrical lens and an aspheric lens.

Figure 10A:
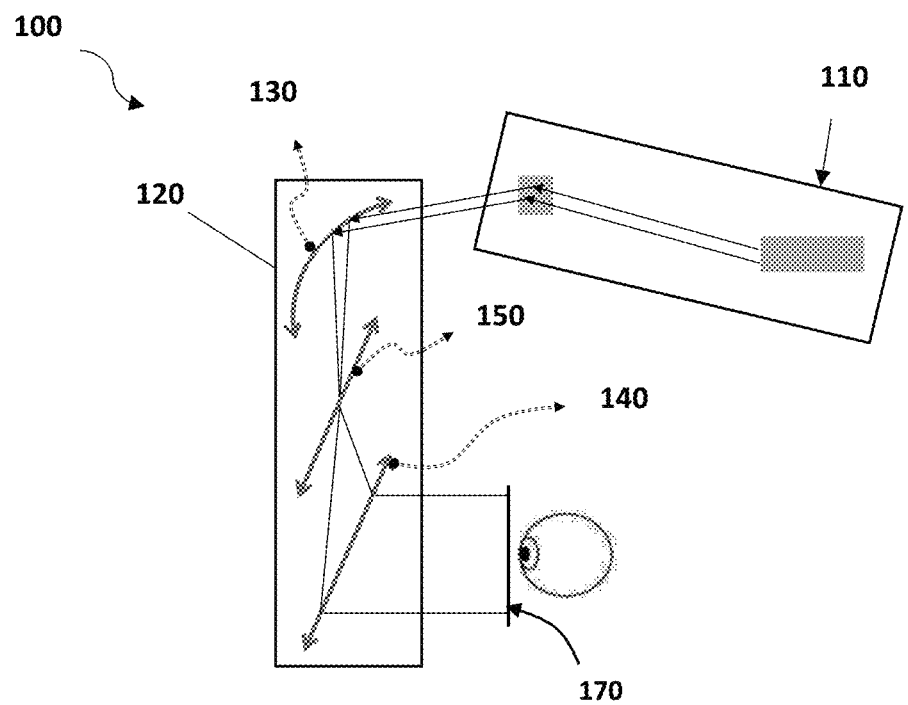
FIGS. 10A and 10B show two more examples of the relay system of the present disclosure configured to enable a light engine to be located at the side of the eyebox of the system, wherein FIG. 10A exemplifies the system utilizing a mirror with converging optical power functioning as the first lens of the 4f-system, and FIG. 10B exemplifies the system utilizing a polarization control assembly.

FIG. 10A shows an exemplary optical system 100 configured as a relay system including an off-axis 4f-system 120 where the first lens 130 is implemented as a reflective mirror with converging optical power, and the second lens 140 is formed by one or more SRDOEs configured as described above. Also, in this example, the system 120 includes an optical unit 150 configured as a beam expander 150 located in the intermediate image plane of the 4f-system.

Figure 10B:
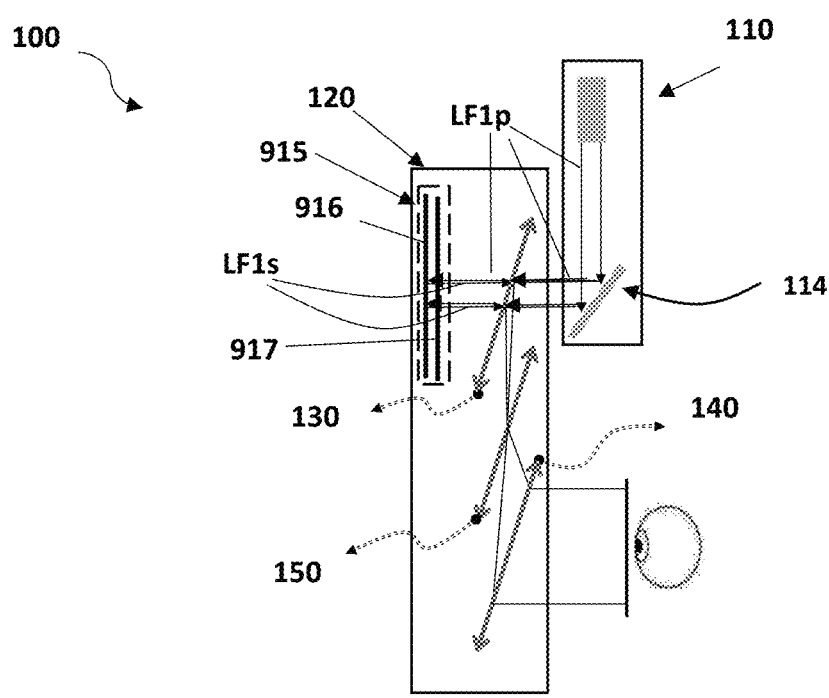

FIG. 10B shows an exemplary optical system 100 configured as a relay system including an off-axis 4f-relay system 120. The off axis 4f-system 120 includes first and second lenses 130 and 140 formed by first and second parallel stacks of SRDOEs, and includes a beam expander 150 located in the intermediate image plane of the 4f-system. In this example, the system 120 further includes a polarization control assembly 915 accommodated at an optical path of non-diffracted light transmitted through the first lens 130.

The addition of such polarization control assembly might be associated with a need of placing the light engine unit 110 at the same side as the eyebox created by the system (i.e. at the same side as user's eye). Thus, in such configuration, the lens 130 is configured for diffraction of selected polarization, s-polarization. P-polarized components of the input light field, LF1$p$ are thus not diffracted by the lens 130 but transmitted therethrough (through the zeroth order) and thus interact with the assembly 915. The latter includes a polarization rotator 917 implemented as a quarter wave plate (QWP) and a reflector 916. Thus, the p-polarized light LF1$p$ from the light engine 110 passes through the first lens 130 of the 4f-system (through the zeroth order of lens), and then passes once through the QWP 917; the so-produced circularly polarized light is reflected from the mirror 916 to pass back through the QWP 917 and again undergo polarization rotation, thus producing 90-degree polarization rotated light, i.e. s-polarized light LF1$s$, which is finally diffracted by the first lens 130.

As mentioned above, such configuration may be advantageous since it allows placing the light engine 110 on the same side as user's eye, thus providing a compact form factor of the optical system.

Figure 10C:
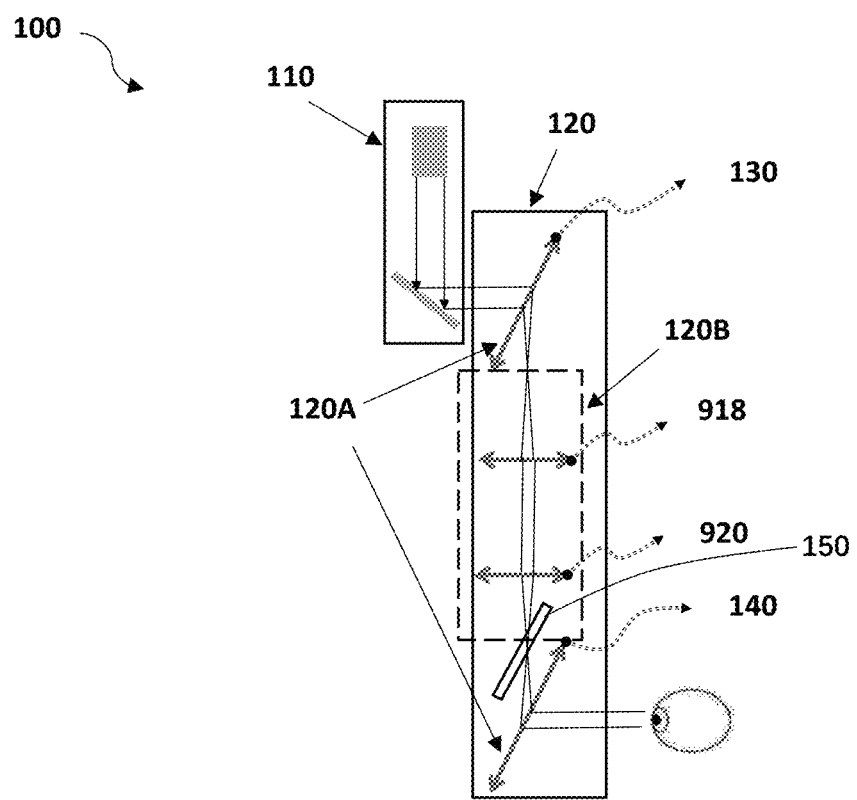
FIGS. 10C and 10D show two more examples of the optical system of the present disclosure in which the relay system includes two 4f-systems forming an 8f-system.
Figure 10D:
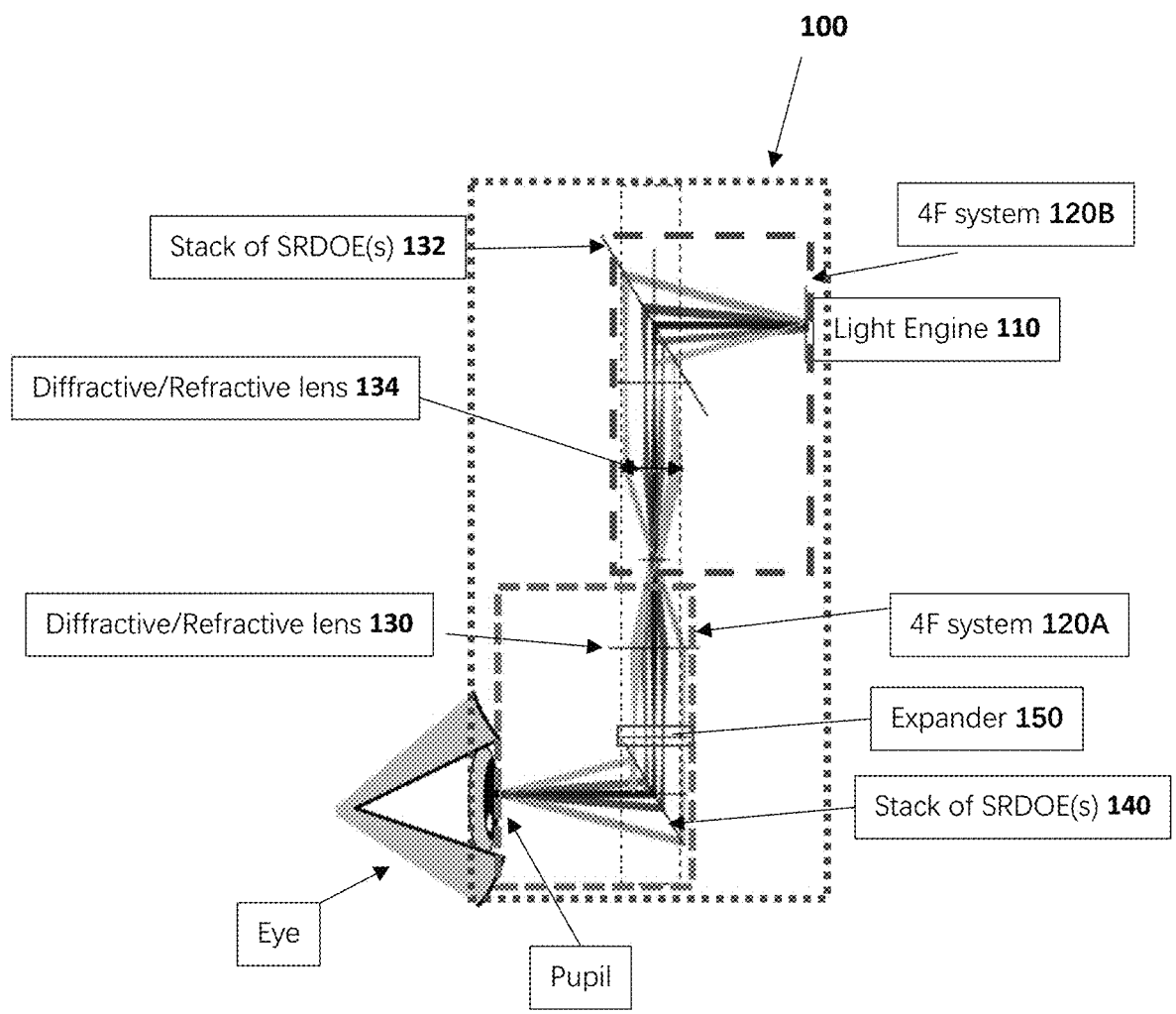

Reference is made to FIGS. 10C and 10D which exemplify the relay system configurations of the present disclosure which includes two 4f-systems arranged to form a 8f-system. These configurations might be advantageous to reduce dispersion.

FIG. 10C shows an exemplary optical system 100 configured as a relay system including two s 4f-systems 120A and 120B. The system 120A is the off-axis 4f-system 120A includes lenses 130 and 140 formed by SRDOE(s) as described above. The 4f-system 120B is an on-axis 4f-system whose lenses 918 and 920 may or may not include SRDOE(s), e.g. may be implemented with refractive optics. These two systems 120A and 120B forming together an 8f-system that supports a light engine with a large bandwidth, e.g., of 20 nm. In this example, the arrangement is such that system 120A is an outer off-axis 4f-system, while system 120B is an on-axis inner 4f-system. It should be noted that optionally, but in some embodiments preferably, the 8f-system includes a beam expander 150 in an intermediate image plane between the second lenses 140 and 920 of the systems 120A and 120B, respectively.

FIG. 10D shows an exemplary optical system 100 configured as a relay system including an 8f-system. In this example, such 8f-system is formed by two sequentially arranged (with respect to light propagation direction through the system) off-axis 4f-systems 120A and 120B. The off-axis 4f-system 120A is configured and operable according to the present disclosure as described above, i.e., includes two lenses of which the second "combining" lens 140 is configured as the SRDOE (or SRDOEs stack). The first lens 130 is optically connected to the light engine 110 via the second off-axis 4f-system 120B. This system 120B includes first and second lenses 132 and 134 and relays the virtual light field to the system 120A. Also, in this system 120B, the first lens 132 is formed by the SRDOE (or stack of SRDOEs). The second lens 134 of system 120B and first lens 130 of system 120A may be diffractive or refractive lenses. It should be noted that optionally, but in some embodiments preferably, the off-axis 4f-system 120A includes a beam expander 150 in the intermediate image plane.

Figure 10E:
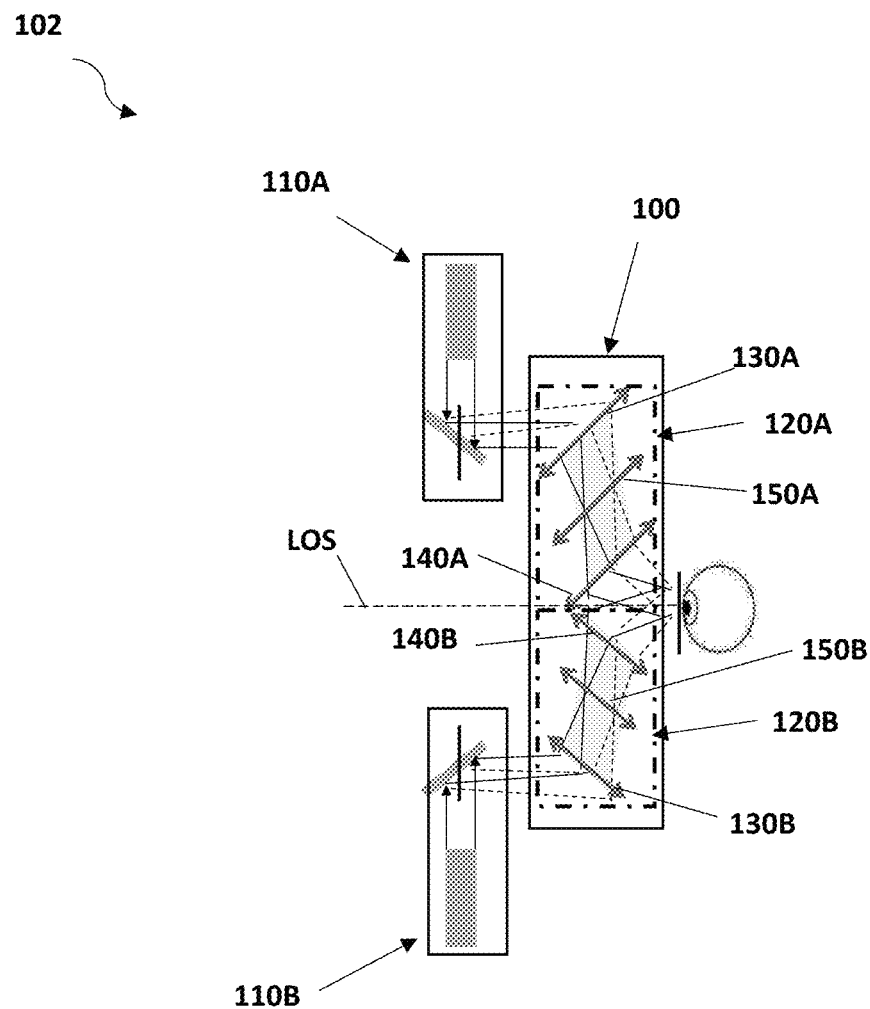
FIG. 10E exemplifies another configuration of the near-eye mixed-reality system of the present disclosure formed by two symmetrically identical relay systems forming two halves of the FOV on the common eyebox.

Reference is made to FIG. 10E which shows an exemplary near-eye mixed reality system 102 including an optical system 100 configured as a relay system formed by two off-axis 4f-systems 120A and 120B. In this example, the two off-axis 4f-systems 120A and 120B are separate and independently operable systems which are associated with light engines 110A and 110B, respectively, and are configured and operable as symmetrically identical systems with respect to an eye's line of sight LOS. In each of these systems, at least the second lens 140A, 140B (or the first lens 130A, 130B as well) is formed by the SRDOE (or stack of SRDOEs). It should be understood that each of the systems 120A and 120B is configured with halved field of view wherein the two halved fields of view complement each other. In some embodiments, these systems 120A and 120B may also include optical units 150A and 150B, which may be configured as beam expanders and/or aberration correctors.

Reference is made to FIGS. 11A to 11H which show schematically an example of a near-eye mixed-reality system 102 configured for incorporation in an augmented reality glasses. The system 102 includes an optical system configured according to the present disclosure (generally, as either one of the above-described examples) configured for incorporation into the lens of the glasses.

Figures 11A, 11B:
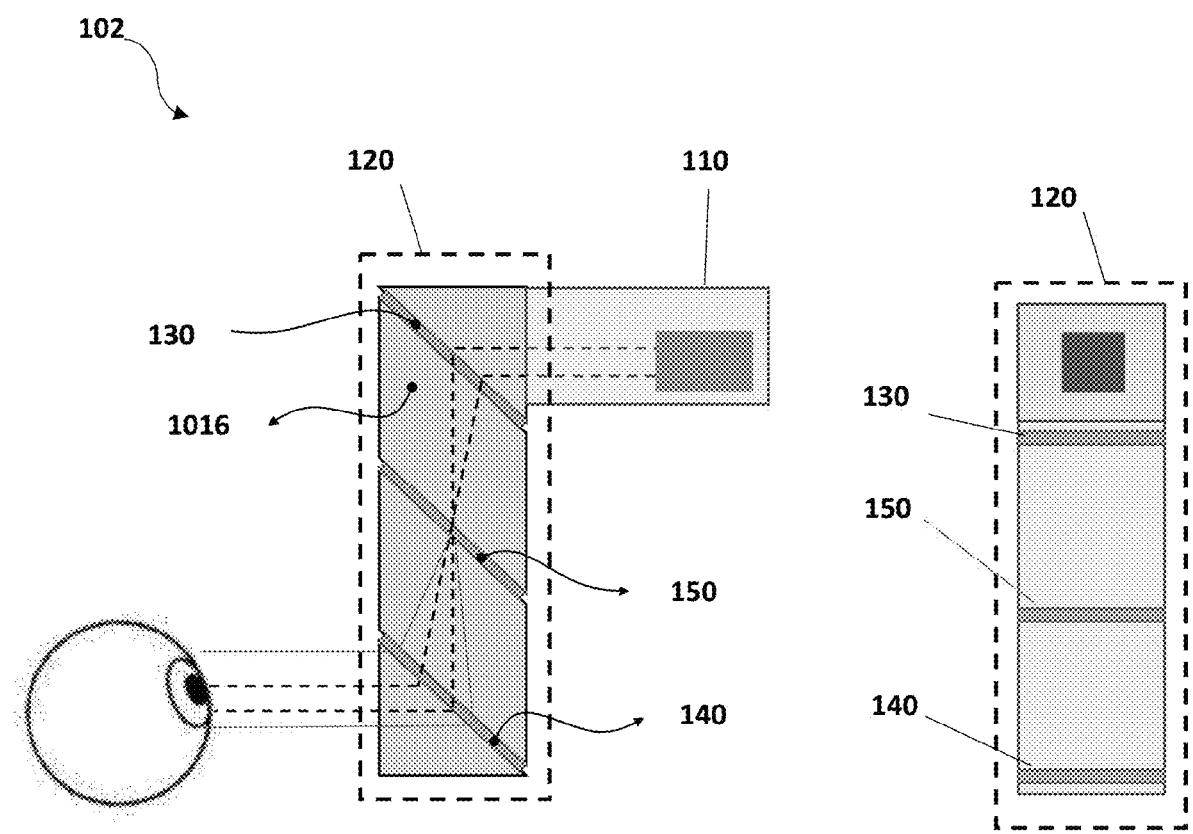
FIGS. 11A and 11B shows schematically an example of the near-eye mixed-reality system of the present disclosure configured to be incorporated in virtual/augmented reality glasses.
Figure 11C:
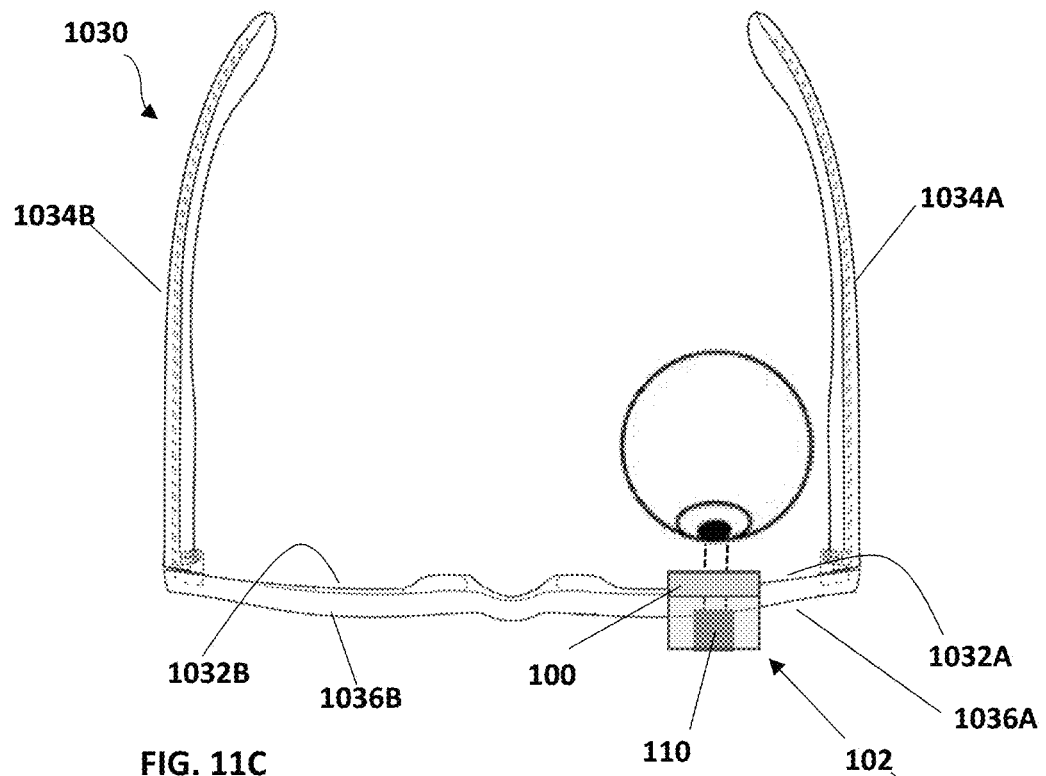
FIGS. 11C to 11E show, respectively, top, side and front views of virtual/augmented reality glasses carrying the system of FIGS. 11A-11B mounted thereon.
Figure 11D:
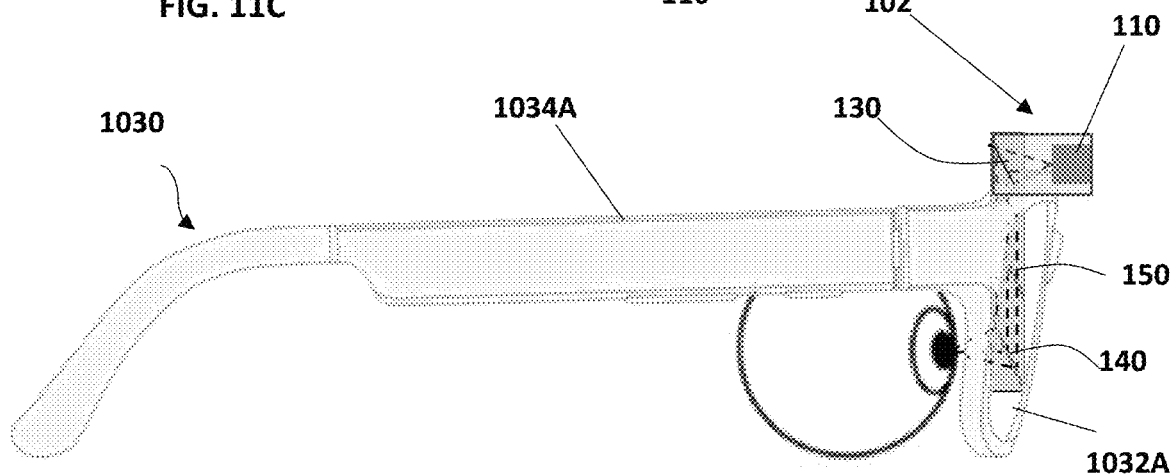
Figure 11E:
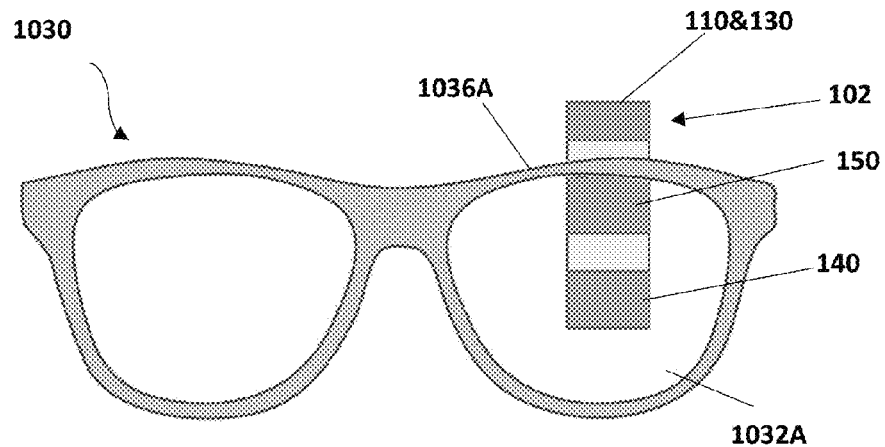
Figure 11F:
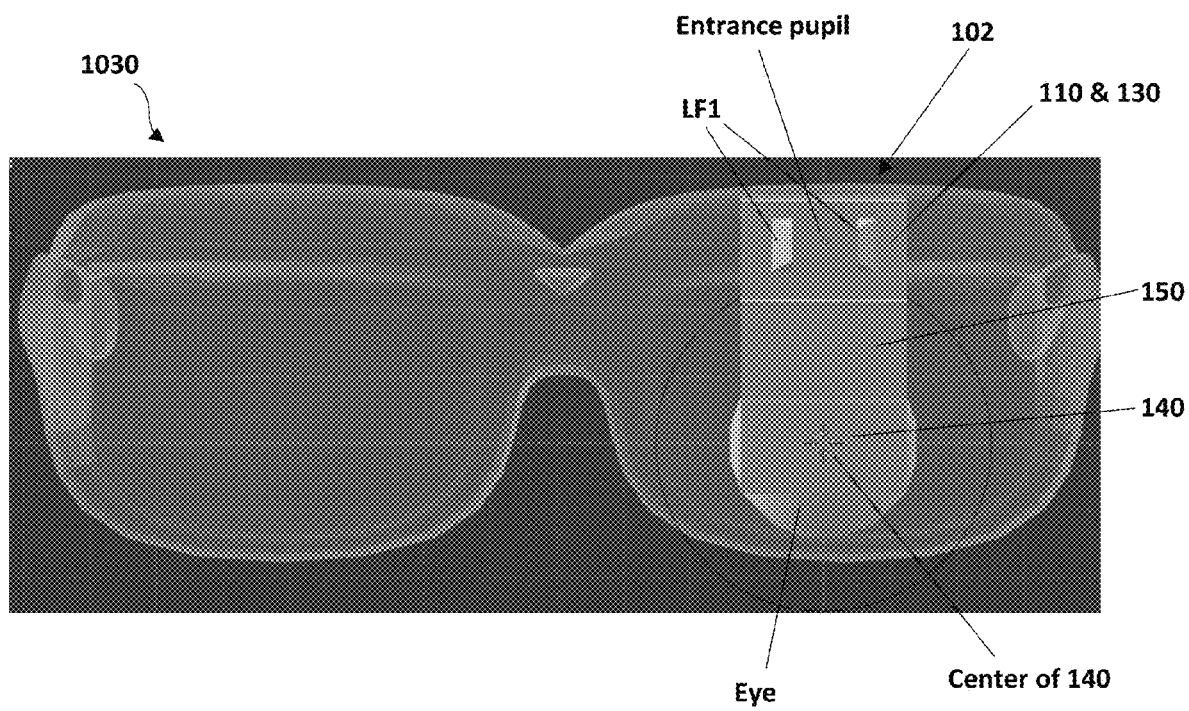
FIGS. 11F and 11G show, respectively, front and side views of 3D modeled glasses incorporating the optical system of FIGS. 11A-11B.
Figure 11G:
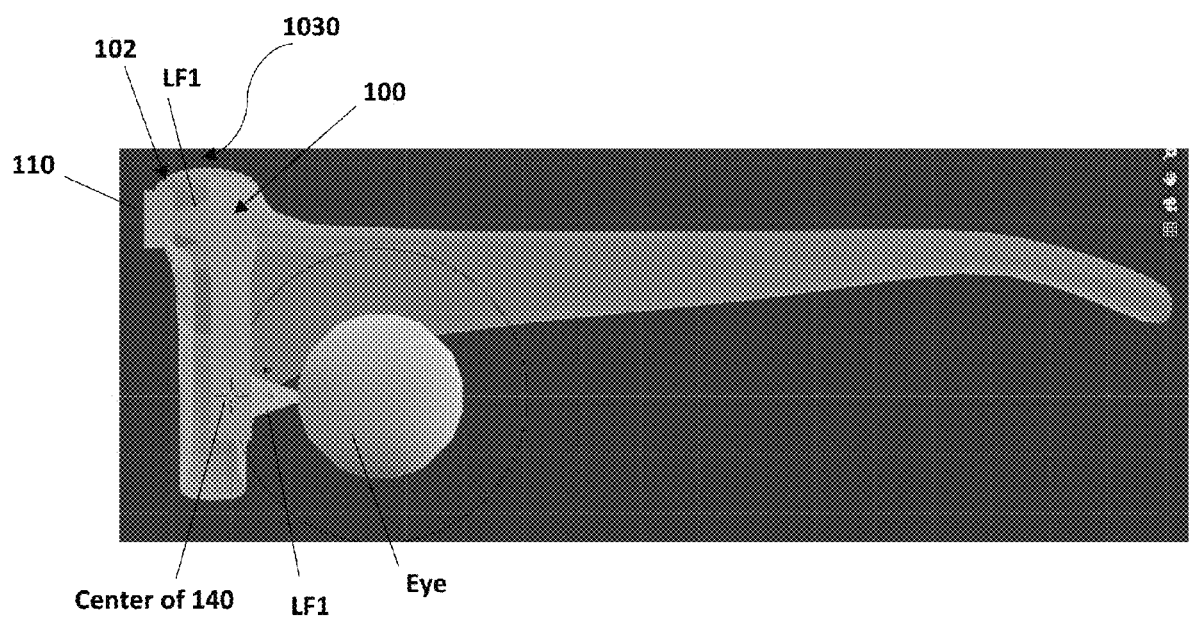

FIGS. 11A and 11B show, respectively, a side view and a front view of the optical system 100 configured as a relay system including the off-axis 4f-system 120 associated with a light engine 110. In this example, the system 120 is configured as described above with reference to FIG. 9A.

The optical components of the system 120 may be mounted on a suitable optically transparent supports, e.g. polycarbonate cubes or air holders 1016.

It should be noted, although not specifically, shown that the light engine typically includes a light source unit (e.g. RGB lasers) associated with a beam combiner; and a scanning mirror (e.g. MEMS based scanner). The scanner which defines an entrance pupil of the near-eye mixed reality system (i.e. the output of the scanner is located at the focal plane of the first lens of the relay system) receives the combined beam from the beam combiner and properly performs projection, by scanning, of a 2D image (virtual light field) on the on the relay system.

FIGS. 11C to 11F exemplify various illustrations, which show in a self-explanatory manner, how the system 100 of the present disclosure can be easily mounted on/incorporated in virtual reality or augmented reality glasses 1030. In the figures, only one system 100 is shown associated with one of the lenses of the glasses, but it should be understood that the second system can in the same manner be mounted on the second lens. The system 100 can be configured as described above with reference to FIGS. 11A and 11B.

The elements of each system 102 can be properly distributed between the glasses' lens 1032A, 1032B, temples 1034A, 1034B and frame parts 1036A, 1036B, as well as between the "active" region of the lens, being a central region exposed to eye's pupil, and an "inactive" periphery region of the lens as the case may be.

The configuration may be such that the light engine 110 and the first lens 130 of the relay system 100 may be is accommodated in/mounted on the frame part of the glasses, the expander 150 if used may be located in periphery region of the glasses' lens, while the second lens 140 is located in/aligned with the central active region of the glasses' lens. This is shown more specifically in FIGS. 11D to 11G, showing the accommodation of the elements of the system 102 in relation to the parts of the glasses 1030 and also light field LF1 propagation through the system 102, i.e., from the light engine to the eye via the relay system 100.

Figure 12C:
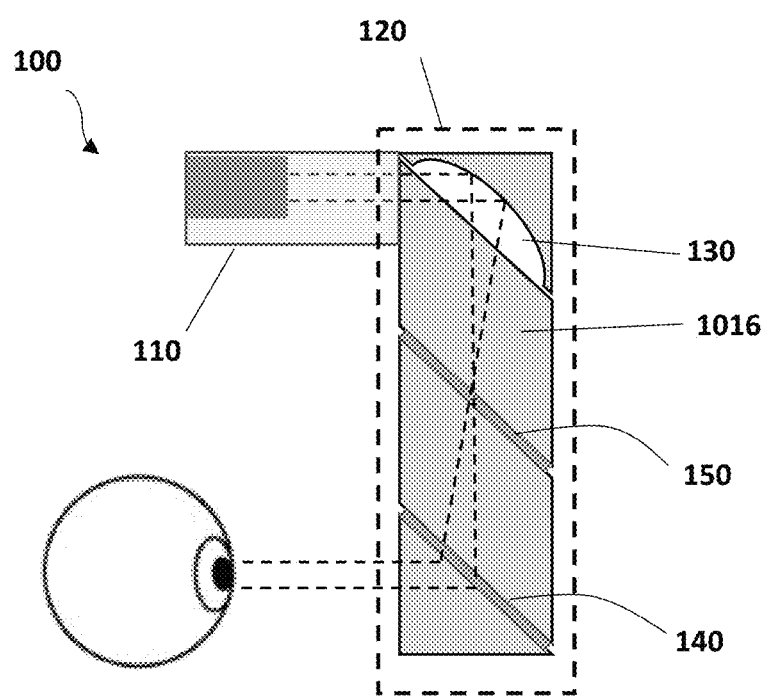
FIG. 12C shows a side view of another exemplary optical system configured as a module that can be attached to/incorporated in virtual/augmented reality glasses, wherein the systems are configured to enable the light engine to be on the same side as the eyebox.

FIGS. 12A to 12E show schematically some more examples of the system configuration suitable to be incorporated in/mounted on virtual/augmented reality glasses. The system 102 shown in FIGS. 12A and 12B is configured generally similar to that described above with reference to FIGS. 11A and 11B, but in which there is also included a polarization control assembly 915 accommodated at an optical path of non-diffracted light transmitted through the first lens 130.

The configuration and operation of such polarization control assembly 915 is described above with reference to the example of FIG. 10B. The assembly 915 includes a polarization rotator 917 implemented as a quarter wave plate (QWP) and a reflector 916. As described above, the lens 130 diffracts light of selected polarization, e.g. s-polarization. Hence, p-polarized components of the input light field LF1$p$ are not diffracted by the lens 130 and are transmitted through the lens 130 and interact with the assembly 915. This provides that p-polarized light part LF1$p$ of the light field produced by the light engine 110 passes through the first lens 130 (through the zeroth order of lens), and then passes once through the QWP 917 which produces circularly polarized light which is reflected from the mirror 916 and passes back through the QWP 917 thus again undergoing polarization rotation resulting in 90-degree polarization rotated light, i.e. s-polarized light LF1$s$, which is finally diffracted by the first lens 130.

Figure 12D:
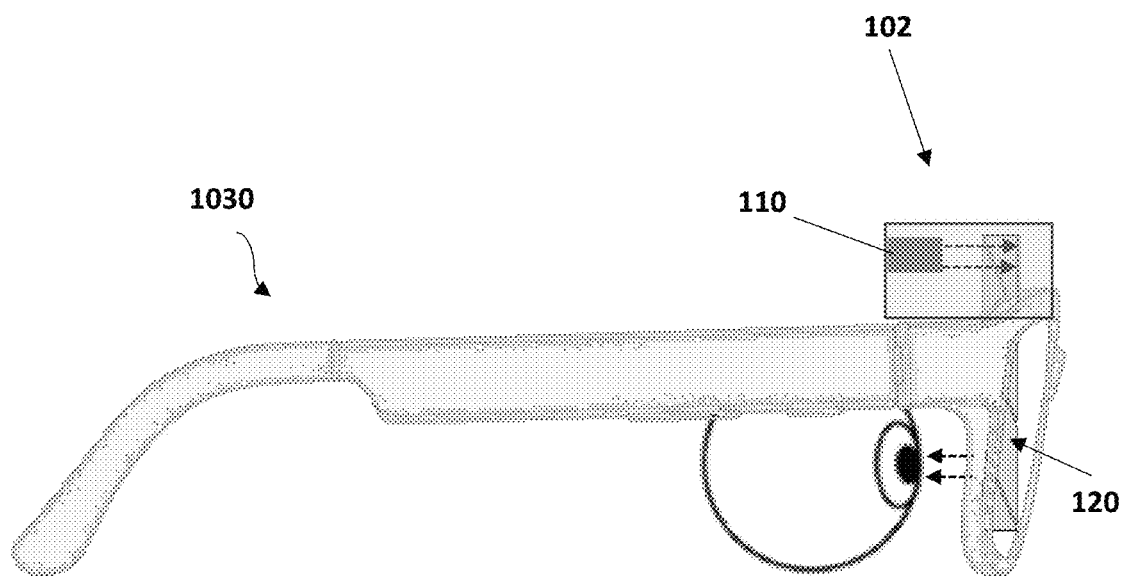
FIG. 12D illustrates glasses carrying therein the system of the present disclosure configured as either one of the examples of FIGS. 12A-12B and 12C.

The system 102 exemplified in FIG. 12C is configured according to the general principles of the present disclosure, i.e. its relay system 100 includes off-axis 4f-system 120 configured as described above in which the second lens 140 is configured as the SRDOE. Here, however, similar to the example of FIG. 10A, the first lens 130 of the 4f-system is configured as a reflective lens, i.e., reflective mirror with converging optical power. As described above, this configuration allows to locate the light engine at the same side as the eyebox of the system, which might be suitable for the system design aimed at being used with virtual/augmented glasses. This is schematically illustrated in FIG. 12D.

FIGS. 13A to 13E show another example of the configuration of the optical system 100 and the near-eye mixed-reality system 100 using the same according to the present disclosure, which are also suitable for use with virtual/augmented reality glasses.

FIGS. 13A-13C show top, side and front views of the exemplary system 102, which is configured generally similar to the system of FIG. 12A (i.e. where the relay system also includes the polarization control assembly 915 configured and operable as described above). However, in the system of this example of FIGS. 13A-13C, the optical element 150 is configured as a folding mirror while may or may not be formed with beam expanding functionality (e.g. Metasurface).

Figure 13D:
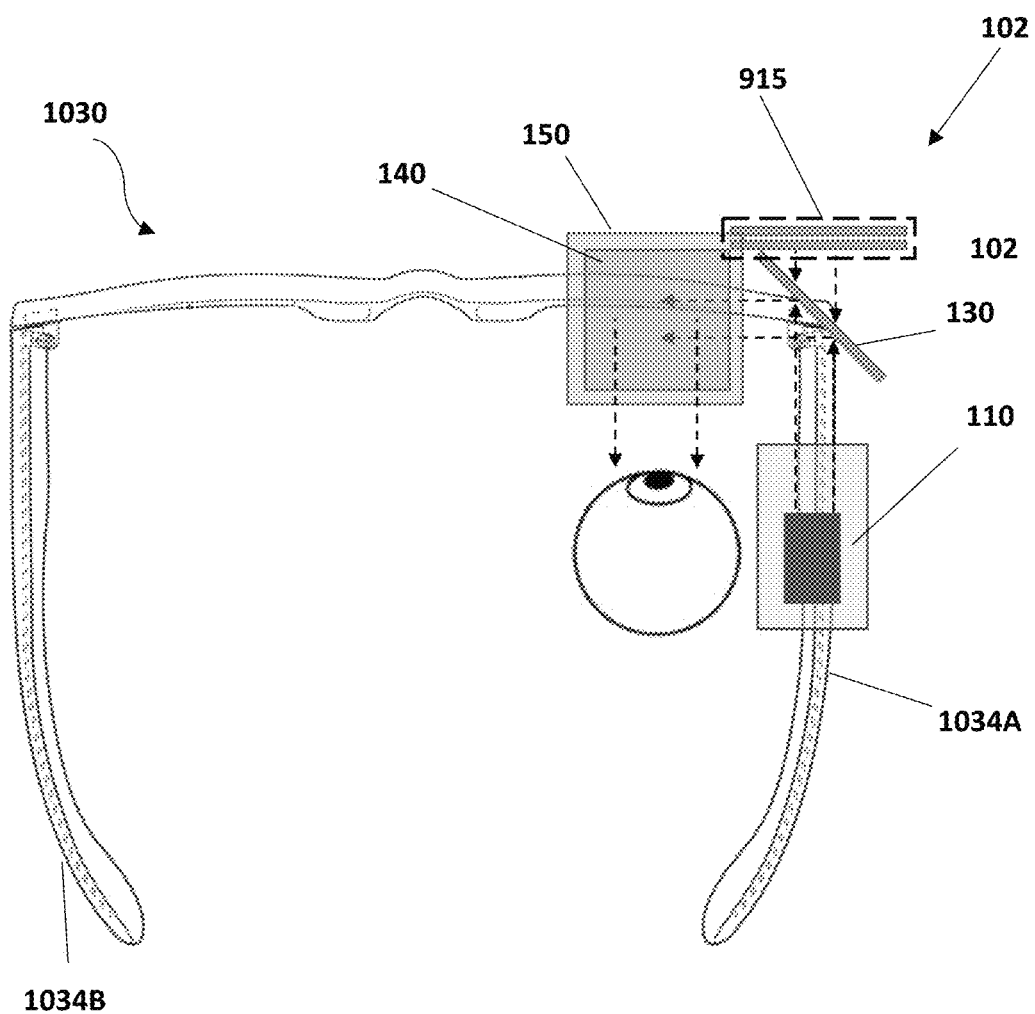
FIG. 13D shows virtual/augmented reality glasses carrying the system of FIGS. 13A-13C.

The configuration of FIGS. 13A-13C allows the system 102 to be even more compact, and also allows accommodation of the light engine 110, lens 130 and assembly 915 on temples of the glasses. This is shown in FIG. 13D.

Figure 13E:
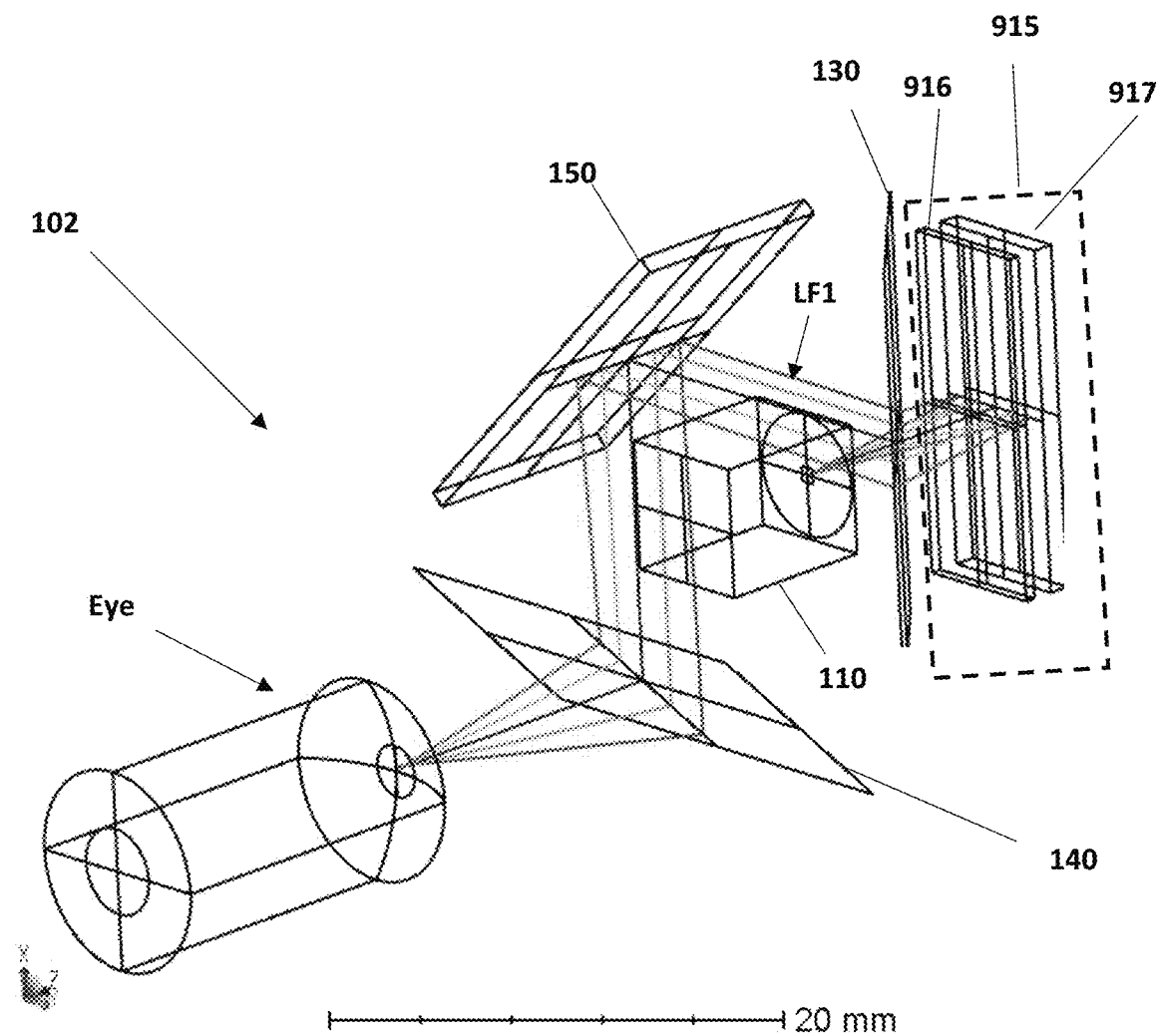
FIG. 13E illustrates a perspective view of the elements of the exemplary system of FIGS. 13A-13C and light propagation scheme therein.

FIG. 13E illustrates more specifically a perspective view of the above described exemplary system 102. The figure illustrates in a self-explanatory manner the accommodation of the elements of the system and the light propagation scheme therethrough. As shown, such a folding configuration (due to the use of the folding mirror 150, which may be a beam expander as well) provides for a very small footprint configuration which may be easily incorporated in/mounted in the glasses' temples and frame parts.

The invention claimed is:

1. An optical system for use in a near-eye mixed reality system, comprising
 a relay system defining an eyebox of the optical system, said relay system being configured and operable to relay a virtual image light field from a light-engine onto an eye pupil plane while combining said virtual image with real-world light field,
 wherein said relay system is configured as a free space relay system configured for free space propagation of said virtual image light field being relayed while combining said free space propagating virtual image light field with the real world light field, said free space relay system comprising at least one off-axis 4f-system,
 wherein each of said at least one off-axis 4f-system comprises at least one lens formed from at least one resonance-domain surface relief diffractive optical element (SRDOE) operable for combining said virtual image light field with the real-world light field, said at least one SRDOE being configured with a predetermined global surface relief pattern characterized by global variation of at least some of pattern parameters across said SRDOE.

2. The system according to claim 1, wherein said at least some parameters of the SRDOE comprise two or more of the following: period, line width, etching depth, slant angle, and side wall angle.

3. The system according to claim 1, wherein each of said at least one SRDOE is configured to be operable in a Bragg regime with first and second dominant diffraction orders, wherein the first dominant diffraction order is a first diffraction order, and the second dominant diffraction order is a zeroth diffraction order for which the SRDOE is substantially transparent.

4. The system according to claim 3, wherein the SRDOE operable for combining said virtual image light field with the real-world light field is configured with the first and second dominant diffraction orders for, respectively, the virtual light field and the real-world light field.

5. The system according to claim 3, wherein the SRDOE is configured such that said first and second dominant diffraction orders correspond to ranges of polar ($\theta\_diff$) and azimuthal ($\phi\_diff$) diffraction angles, each of said ranges being 10-80 degrees.

6. The system according to claim 3, characterized by at least one of the following: (a) said SRDOE is configured such that diffraction efficiencies of said first and second dominant diffraction orders are substantially the same, each being about 50% for the light field at each of the at least one selected wavelengths and selected polarization state; and (b) said SRDOE is configured such that the second dominant diffraction order, being zeroth diffraction order, is essentially transmitting for the light field incident thereon having light components other than said at least one selected wavelength and selected polarization state.

7. The system according to claim 1, wherein each of said at least one SRDOE is configured as a wavelength and polarization selective lens for each of at least one selected wavelength and selected polarization state.

8. The system according to claim 7, wherein said SRDOE is configured such that one of said first and second dominant diffraction orders thereof diffracts more than 90% of the light field at each of said at least one selected wavelength and selected polarization state.

9. The system according to claim 8, characterized by at least one of the following: (i) said second dominant diffraction order, being the zeroth order, is said one of the first and second dominant diffraction orders diffracting more than 90% of the light field; and SRDOE is configured such that diffraction efficiencies of said first dominant diffraction order and said second dominant diffraction order, being the zeroth diffraction order, are, respectively, 10% and 90%, thereby providing high transparency of the SRDOE.

10. The system according to claim 1, wherein the global surface relief pattern is formed from a continuous two-dimensional arrangement of unit cells, each unit cell being configured as a surface relief diffraction grating (SRDG) having locally unchanged values of said at least some parameters across the SRDG.

11. The system according to claim 1, wherein said lens, formed from the at least one SRDOE is made of one of the following materials: fused silica (FS), silicon nitride (Si3N4), titanium dioxide (TiO2), Epoxy resins, glass, plastic.

12. The system according to claim 1, wherein the SRDOE is located on a surface of a substrate made of fused silica (FS).

13. The system according to claim 1, wherein said at least one lens formed from the at least one SRDOE comprises a stack of two or more SRDOEs configured for selected two or more different wavelengths of a visible spectral range.

14. The system according to claim 13, wherein the stack of SRDOEs comprises three SRDOEs configured for selected wavelengths of red, green, and blue spectra, respectively.

15. The system according to claim 13, wherein said stack comprises an additional SRDOE configured for a selected wavelength in an infrared spectral region.

16. The system according to claim 1, wherein said at least one off-axis 4f-system comprises the off-axis 4f-system having a first lens exposed to the light field from the light engine and a second lens combining the virtual light field and the real world light field to propagate to the eyebox, wherein said second lens is said at least one lens formed by the at least one SRDOE being at least one second SRDOE.

17. The system according to claim 16, characterized by one of the following: (1) the first lens of the off-axis 4f-system is configured as a mirror with converging optical power; (2) the first lens of the off-axis 4f-system is formed by at least one second SRDOE having a second predetermined global surface relief pattern different from the predetermined global surface relief pattern of the at least one first SRDOE.

18. The system according to claim 16, wherein the first lens of the off-axis 4f-system is formed by at least one second SRDOE having a second predetermined global surface relief pattern different from the predetermined global surface relief pattern of the at least one first SRDOE, the system further comprising a polarization control assembly comprising a quarter waveplate accommodated in an optical path of light transmitted by the first lens, and a reflector redirecting light output of the quarter waveplate to pass back therethrough, thereby providing 90-degree polarization rotation of the virtual light field propagating back to be diffracted by the first lens.

19. The system according to claim 16 wherein the first lens of the off-axis 4f-system is formed by at least one second SRDOE having a second predetermined global surface relief pattern different from the predetermined global surface relief pattern of the at least one first SRDOE, said first and second lenses of the off-axis 4f-system comprising, respectively, first and second stacks of the first and second SRDOEs, each of the first and second stacks comprising two or more SRDOEs configured for selected two or more wavelengths of a visible spectral range.

20. The system according to claim 19, wherein each of said first and second stacks further comprises an additional SRDOE configured for a selected wavelength in an infrared spectral region.

21. The system according to claim 16, wherein the relay system comprises two of said off-axis 4f-systems, wherein first lenses of the two 4f-systems receive virtual light fields from two, respective light engines, and second lenses of the two 4f-systems define the eyebox of the relay system.

22. The system according to claim 1, wherein said at least one off-axis 4f-system comprises the off-axis 4f-system comprising an optical element accommodated in an intermediate image plane of the off-axis 4f-system.

23. The system according to claim 22, wherein said optical element is configured as at least one of the following: an aberration corrector, a beam expander, and a beam reflector.

24. The system according to claim 23, wherein said optical elements is configured as a dispersion corrector.

25. The system according to claim 22, wherein said optical element comprises a light interacting surface configured as any one of: Metasurface, diffractive or refractive element.

26. The system according to claim 1, wherein said free space relay system comprises an additional off-axis 4f-system, said relay system thereby defining an off-axis 8f-system.

27. A near-eye mixed reality system comprising: a projector unit comprising at least one light engine and at least one scanner; and the optical systems configured according to claim 1.

28. An augmented reality system comprising a pair of near-eye mixed reality systems in association with left and right eyes of a user, each of the near-eye mixed reality systems configured according to claim 27.

29. Augmented reality glasses comprising left and right glass lenses within a glasses frame, and comprising first and second near-eye mixed reality systems associated with the left and right glass lenses, each of the first and second near-eye mixed reality systems being configured according to claim 27.

30. The glasses according to claim 29, characterized by at least one of the following: at least a part of each of first and second relay systems of the first and second near-eye mixed reality systems, respectively, is integral with a respective one of the left and right glass lenses; each of first and second projector units of the first and second near-eye mixed reality systems, respectively, is located on a part of the glasses frame or on a glasses temple in a vicinity of a respective one of the left and right glass lenses.

31. An optical system for use in a near-eye mixed reality system, comprising
a relay system defining an eyebox of the optical system, said relay system being configured and operable to relay a virtual image light field from a light-engine onto an eye pupil plane while combining said virtual image with real-world light field,
wherein said relay system is configured as a free space relay system configured for free space propagation of said virtual image light field being relayed, said free space relay system comprising at least one off-axis 4f-system,
wherein each of said at least one off-axis 4f-system comprises at least one lens formed from at least one resonance-domain surface relief diffractive optical element (SRDOE) operable for combining said virtual image light field with the real-world light field, said at least one SRDOE being configured with a predetermined global surface relief pattern characterized by global variation of at least some of pattern parameters across said SRDOE, and
wherein each of said at least one SRDOE is configured to be operable in a Bragg regime with first and second dominant diffraction orders, wherein the first dominant diffraction order is a first diffraction order, and the second dominant diffraction order is a zeroth diffraction order for which the SRDOE is substantially transparent.

32. An optical system for use in a near-eye mixed reality system, comprising
a relay system defining an eyebox of the optical system, said relay system being configured and operable to relay a virtual image light field from a light-engine onto an eye pupil plane while combining said virtual image with real-world light field,
wherein said relay system is configured as a free space relay system configured for free space propagation of said virtual image light field being relayed, said free space relay system comprising at least one off-axis 4f-system, wherein each of said at least one off-axis 4f-system comprises at least one lens formed from at least one resonance-domain surface relief diffractive optical element (SRDOE) operable for combining said virtual image light field with the real-world light field, said at least one SRDOE being configured with a predetermined global surface relief pattern characterized by global variation of at least some of pattern parameters across said SRDOE, wherein each of said at least one SRDOE is configured as a wavelength and polarization selective lens for each of at least one selected wavelength and selected polarization state.

33. An optical system for use in a near-eye mixed reality system, comprising
a relay system defining an eyebox of the optical system, said relay system being configured and operable to relay a virtual image light field from a light-engine onto an eye pupil plane while combining said virtual image with real-world light field,
wherein said relay system is configured as a free space relay system configured for free space propagation of said virtual image light field being relayed, said free space relay system comprising at least one off-axis 4f-system,
wherein each of said at least one off-axis 4f-system comprises at least one lens formed from at least one resonance-domain surface relief diffractive optical element (SRDOE) operable for combining said virtual image light field with the real-world light field, said at least one SRDOE being configured with a predetermined global surface relief pattern characterized by global variation of at least some of pattern parameters across said SRDOE, and wherein said at least one off-axis 4f-system comprises the off-axis 4f-system having a first lens exposed to the light field from the light engine and a second lens combining the virtual light field and the real world light field to propagate to the eyebox, wherein said second lens is said at least one lens formed by the at least one SRDOE being at least one second SRDOE.

* * * * *